United States Patent
Negishi et al.

(10) Patent No.: US 11,045,950 B2
(45) Date of Patent: Jun. 29, 2021

(54) DRIVING DEVICE AND DETECTING DEVICE

(71) Applicant: CANON KABUSHIKI KAISHA, Tokyo (JP)

(72) Inventors: Mahito Negishi, Tachikawa (JP); Isamu Okuma, Inagi (JP); Shuuichi Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/655,807

(22) Filed: Oct. 17, 2019

(65) Prior Publication Data
US 2020/0139544 A1  May 7, 2020

(30) Foreign Application Priority Data

Nov. 2, 2018  (JP) ............... JP2018-207591
Dec. 14, 2018 (JP) ............... JP2018-234944

(51) Int. Cl.
| | |
|---|---|
| *H02P 1/54* | (2006.01) |
| *B25J 9/16* | (2006.01) |
| *H02P 23/00* | (2016.01) |
| *H02K 7/116* | (2006.01) |

(52) U.S. Cl.
CPC ............ *B25J 9/1635* (2013.01); *H02K 7/116* (2013.01); *H02P 23/00* (2013.01); *G05B 2219/41251* (2013.01)

(58) Field of Classification Search
CPC . G05B 2219/41251; H02P 6/16; H02P 23/00; B25J 9/1635; H02K 7/116
See application file for complete search history.

(56) References Cited

U.S. PATENT DOCUMENTS

| | | |
|---|---|---|
| 7,591,171 B2 | 9/2009 | Negishi |
| 7,915,787 B2 | 3/2011 | Negishi et al. |
| 8,245,317 B2 | 8/2012 | Negishi |
| 8,365,615 B2 | 2/2013 | Sato et al. |
| 8,447,561 B2 | 5/2013 | Negishi |
| 8,744,625 B2 | 6/2014 | Negishi |
| 9,221,174 B2 | 12/2015 | Negishi |
| 9,563,601 B2 | 2/2017 | Sato |

(Continued)

FOREIGN PATENT DOCUMENTS

| | | |
|---|---|---|
| JP | H11-14474 A | 1/1999 |
| JP | 2006-050710 A | 2/2006 |

(Continued)

*Primary Examiner* — Karen Masih
(74) *Attorney, Agent, or Firm* — Venable LLP

(57) ABSTRACT

A driving device includes a driving unit disposed on a fixed member, a supporting member, an output member, an elastic member configured to couple the supporting member and the output member, a first scale, a first sensor configured to detect the rotation angle of the output shaft of the driving unit with the first scale, a second scale, and a second sensor configured to detect the relative displacement between the supporting member and the output member with the second scale. One of the first scale and the first sensor is disposed on the fixed member. The other of the first scale and the first sensor and one of the second scale and the second sensor are disposed on the supporting member. The other of the second scale and the second sensor is disposed on the output member.

22 Claims, 21 Drawing Sheets

(56) References Cited

U.S. PATENT DOCUMENTS

| | | | |
|---|---|---|---|
| 9,764,462 | B2 | 9/2017 | Negishi |
| 9,969,088 | B2 | 5/2018 | Sato |
| 10,201,901 | B2 | 2/2019 | Sato |
| 10,239,206 | B2 | 3/2019 | Negishi |
| 10,456,923 | B2 | 10/2019 | Sato |
| 10,500,733 | B2 | 12/2019 | Okuma |
| 2013/0020980 | A1 | 1/2013 | Orita et al. |
| 2016/0265946 | A1* | 9/2016 | Mase .................. G01B 7/30 |
| 2018/0126551 | A1 | 5/2018 | Amano et al. |

FOREIGN PATENT DOCUMENTS

| | | |
|---|---|---|
| JP | 2013-022677 A | 2/2013 |
| JP | 2015-123570 A | 7/2015 |
| JP | 2018-100445 A | 6/2018 |

* cited by examiner

DRIVING DEVICE AND DETECTING DEVICE

BACKGROUND OF THE INVENTION

Field of the Invention

The present invention relates to a driving device.

Description of the Related Art

In a driving device used in rotary joints of an articulated robot, a reduction gear reduces the rotational speed of a motor, and thereby rotates an output shaft. The rotation of the output shaft is controlled in accordance with output from an encoder disposed at the rotary shaft of the motor and motor current. In such a control method, however, since the rotation of the output shaft is affected by frictional force, viscous force, backlash, and clearance of the reduction gear, it is difficult to control the rotation of the output shaft with high accuracy. For this reason, another control method is proposed.

In this method, in addition to the angle of the rotary shaft of the motor and the motor current, the angle and the torque of the output shaft of the reduction gear are measured and fed back to the motor.

For example, Japanese Patent Application Publication No. 2006-50710 discloses a driving device that includes both a torque sensor and an encoder disposed at the output shaft of the reduction gear. The output shaft of the motor is coupled with the input shaft of the reduction gear for transmitting the output from the motor to the reduction gear. The flex spline of the reduction gear is coupled with the output shaft of the reduction gear. The driving device includes a motor control encoder disposed at the output shaft of the motor, and the output shaft encoder and the torque sensor disposed at the output shaft of the reduction gear. The torque sensor measures a magneto-resistance value of a torque sensor film, and converts the magneto-resistance value to a torque value.

The motor control encoder detects information used to control the motor. The output shaft encoder detects a rotation angle of the output shaft of the reduction gear. The torque sensor detects a torsion torque produced by reaction force from a load, in a state where the output shaft of the reduction gear is coupled with the load. In addition, detection signals detected by those sensors are fed back to a motor driver. With this configuration, deterioration of control accuracy for the output shaft, caused by clearance such as the backlash or hysteresis characteristic of the reduction gear, is reduced.

SUMMARY OF THE INVENTION

According to a first aspect of the present invention, a driving device includes a driving unit disposed on a fixed member, a supporting member, an output member, an elastic member configured to couple the supporting member and the output member, a first scale, a first sensor configured to detect the rotation angle of the output shaft of the driving unit with the first scale, a second scale, and a second sensor configured to detect the relative displacement between the supporting member and the output member with the second scale. One of the first scale and the first sensor is disposed on the fixed member. The other of the first scale and the first sensor and one of the second scale and the second sensor are disposed on the supporting member. The other of the second scale and the second sensor is disposed on the output member.

According to a second aspect of the present invention, a method of controlling a driving device includes inputting a first signal outputted from a first sensor to the control unit, the first sensor being used to detect a rotation angle of an output shaft of the driving unit, inputting a second signal outputted from a second sensor to the control unit, the second sensor being used to detect a relative displacement between the supporting member and the output member, and calculating, by the control unit, a rotation angle of the output member with respect to the fixed member in accordance with the first signal and the second signal. The driving device includes a driving unit disposed on a fixed member, a supporting member, an output member, an elastic member, and a control unit configured to control the driving unit. The supporting member is coupled with the output member via the elastic member. One of a first scale and the first sensor used to detect a rotation angle of the output shaft of the driving unit is disposed on the fixed member. The other of the first scale and the first sensor and one of a second scale and the second sensor used to detect a relative displacement between the supporting member and the output member are disposed on the supporting member. The other of the second scale and the second sensor is disposed on the output member.

According to a third aspect of the present invention, a detecting device includes a fixed member, a supporting member, an output member, an elastic member configured to couple the supporting member and the output member, a first scale, a first sensor configured to detect the rotation angle of the output shaft of the driving unit with the first scale, a second scale, and a second sensor configured to detect the relative displacement between the supporting member and the output member with the second scale. One of the first scale and the first sensor is disposed on the fixed member. The other of the first scale and the first sensor and one of the second scale and the second sensor are disposed on the supporting member. The other of the second scale and the second sensor is disposed on the output member.

Further features of the present invention will become apparent from the following description of exemplary embodiments with reference to the attached drawings.

DESCRIPTION OF THE EMBODIMENTS

Embodiment

Hereinafter, with reference to the accompanying drawings, a driving device of an embodiment of the present invention and an articulated robot including the driving device will be described. Here, in the plurality of drawings that will be referred in the description of the embodiment and some examples, a component having an identical function is given an identical reference symbol, unless specified otherwise.

Basic Configuration of Driving Device

Figure 1:
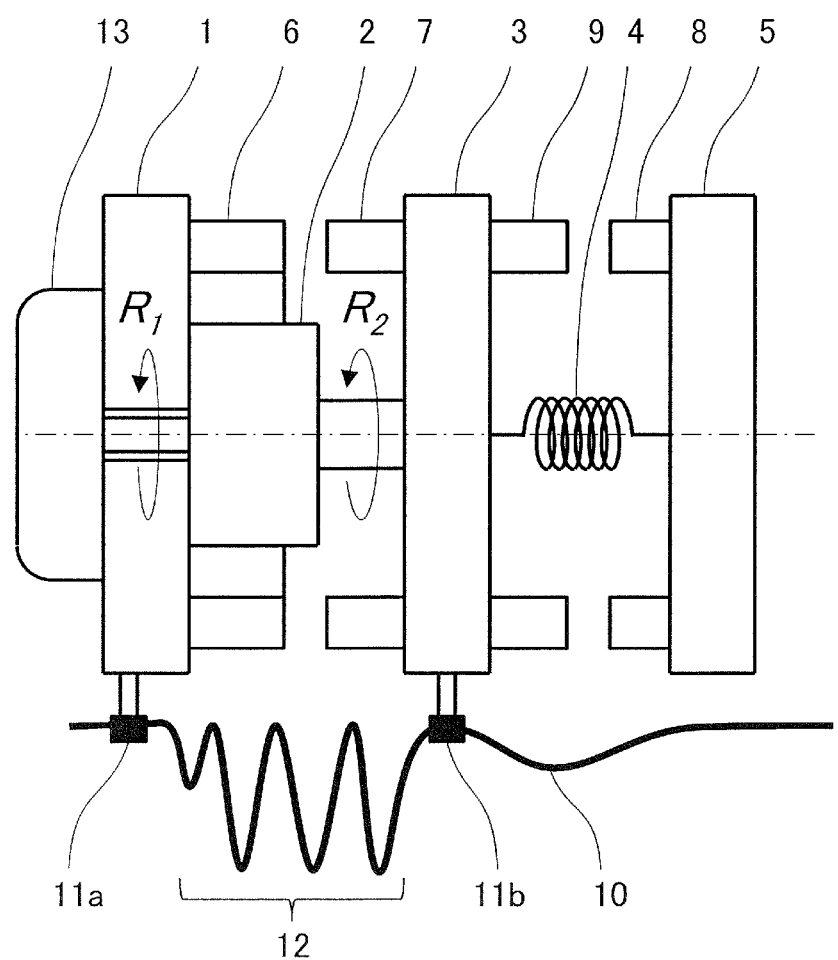
FIG. 1 is a diagram schematically illustrating a configuration of a driving device of an embodiment.

First, with reference to a schematic diagram of FIG. 1, a basic configuration of the driving device of the embodiment will be described. FIG. 1 illustrates the basic configuration of a single driving device. The driving device includes a fixed member 1, a motor 13, a reduction gear 2, and a rotation angle measurement scale 6. The motor 13, the reduction gear 2, and the rotation angle measurement scale 6 are fixed to the fixed member 1. The input shaft of the reduction gear 2 is coupled with the motor 13. When the rotary shaft of the motor 13 rotates (toward a direction indicated by an arrow $R_1$), the output shaft of the reduction gear 2 rotates (toward a direction indicated by an arrow $R_2$) at a reduced speed. The output shaft of the reduction gear 2 is coupled with a supporting member 3. Thus, the supporting member 3 rotates, together with the output shaft of the reduction gear 2 (toward the direction indicated by the arrow $R_2$).

In addition, the driving device also includes a rotation angle measurement sensor 7, a torque measurement sensor 9, an elastic member 4, and an output member 5. The rotation angle measurement sensor 7 is fixed to the supporting member 3 on the reduction gear 2 side, and the torque measurement sensor 9 and the elastic member 4 are fixed to the supporting member 3 on the output member 5 side. That is, the supporting member 3 serves as a base for the rotation angle measurement sensor 7, the torque measurement sensor 9, and the elastic member 4.

The elastic member 4 is coupled with the output member 5, and a torque measurement scale 8 is fixed to the output member 5. The supporting member 3 transmits the rotation of the output shaft of the reduction gear 2 to the elastic member 4, and the elastic member 4 transmits the rotation of the supporting member 3 to the output member 5. Thus, the elastic member 4 is twisted and deformed around its rotation axis in accordance with the amount of torque.

The torque measurement scale 8 fixed to the output member 5 is observed by the torque measurement sensor 9 fixed to the supporting member 3. With this observation, an angle $E_2$ by which the elastic member 4 is twisted and deformed is measured. If the torsional rigidity of the elastic member is denoted by K, the torque transmitted to the output member 5 is obtained by calculating a product $K \cdot E_2$ of the measured angle $E_2$ and the torsional rigidity K.

In addition, the rotation angle measurement scale 6 fixed to the fixed member 1 is observed by the rotation angle measurement sensor 7 fixed to the supporting member 3. With this observation, an angle $E_1$ by which the supporting member 3 is rotated is measured. Thus, the rotation angle of the output member 5 is calculated by adding the measured rotation angle $E_1$ of the supporting member 3 and the measured angle $E_2$ of the elastic member 4.

In the present embodiment, a bundle 10 of wires and pipes that extends through the driving device is fixed to the driving device by a fastening member 11a disposed on the fixed member 1 and a fastening member 11b disposed on the supporting member 3. Since the two fastening members (fixing members) are disposed such that a rotary portion of the driving device is interposed between the fastening members, the two fixing members rotate relative to each other. In addition, the bundle 10 includes a deformable portion 12 formed between the two fastening members and having an additional length. As a result, the wires and pipes are prevented from stretching and restraining the rotation of the rotary portion, and from being pulled and cut by the rotation of the rotary portion.

In the present embodiment, the above-described configuration allows the driving device to achieve less torque-detection error caused by the interference of the wires and the pipes. Specifically, since the bundle 10, which extends through the driving device, is fixed to the fixed member 1 and the supporting member 3, the drag torque produced by the wires and the pipes and caused by the rotation of the rotary portion is exerted to a portion between the fixed member 1 and the supporting member 3, and is not exerted to the elastic member 4 used for detecting torque. In addition, since the amount of torsional deformation of the elastic member 4 caused by the rotation is slight (e.g. about 50 μm), the drag torque produced by the portion of the bundle 10 and caused by the torsional deformation is extremely small. Here, the portion of the bundle 10 extends in front of the elastic member 4. Thus, in the present embodiment, the wires and pipes are suppressed from interfering the elastic member 4 and affecting the amount of deformation of the elastic member 4 when the rotary portion rotates, so that the torque detection error can be significantly reduced.

Articulated Robot

Figure 2:
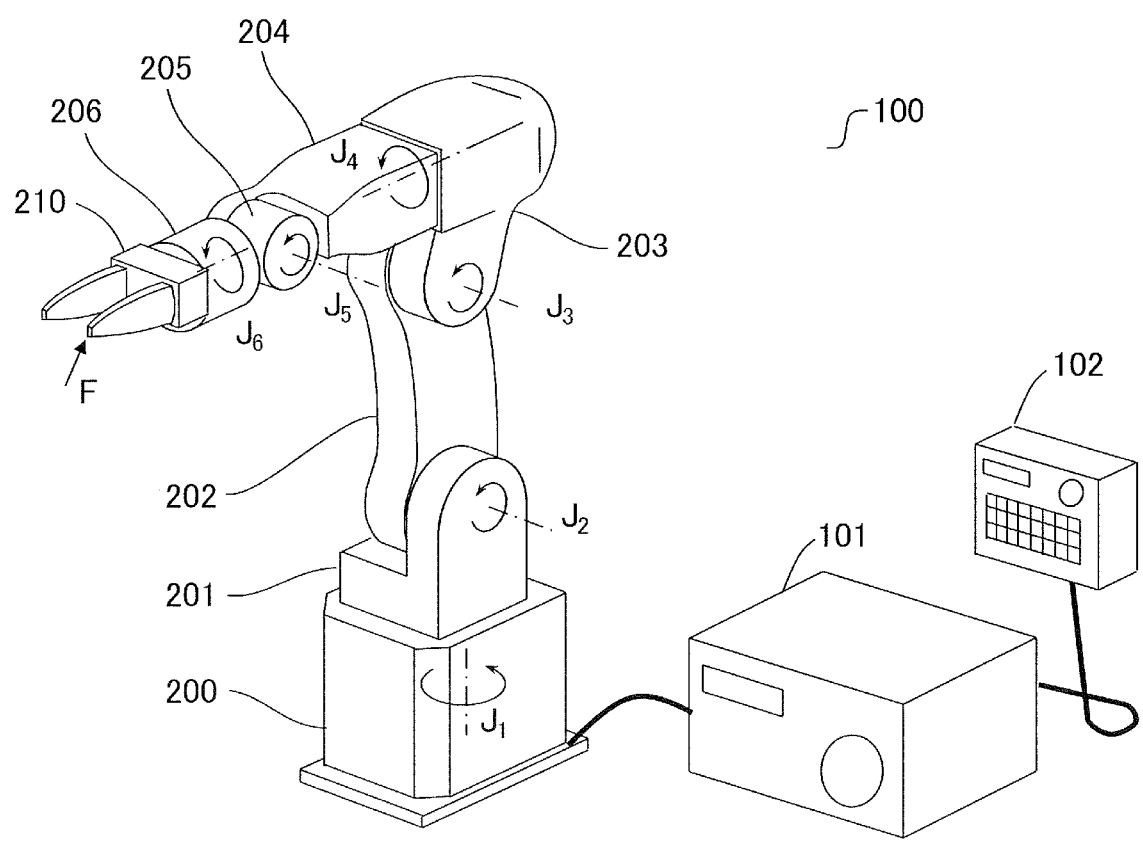
FIG. 2 is an external view of a robot including the driving device of the embodiment.

Next, an articulated robot including the driving device of the present embodiment will be described. FIG. 2 is an external view illustrating an articulated robot (robot arm) 100 as one example of robots including the driving device of the present embodiment.

The driving device of the present embodiment is used in each of six rotary joints $J_1$ to $J_6$ via which links 200 to 206 are serially linked with each other. The torque sensor of each driving device measures torque that is transmitted to a corresponding link through the joint. The leading link can be provided with a robot hand 210.

When an external force F is applied to the robot hand 210, the torque applied to each of the rotary joints $J_1$ to $J_6$ changes. Thus, the torque sensor detects the change of torque, and transmits it to a control device 101 via a line (a bundle of wires) extending through the driving device. The control device 101 performs force control on the rotary joints $J_1$ to $J_6$. For example, when the control device 101 controls the robot so that the robot moves toward a direction detected by the sensor, the flexibility of motion can be produced. This function is important for an assembly robot that moves in accordance with force applied to the hand of the assembly robot. The control device 101 is connected with a teaching pendant 102, with which an operator teaches the motion.

The control device 101 calculates the angle of a link coupled with the output shaft of the reduction gear of each of the rotary joints $J_1$ to $J_6$, by adding the measured rotation angle $E_1$ of the supporting member 3 and the measured angle $E_2$ of torsional deformation of the elastic member 4. The data on the angles $E_1$ and $E_2$ is transmitted from the driving device to the control device 101 via the line. In addition to the rotation angle and current of the motor of each of the rotary joints $J_1$ to $J_6$, the control device 101 measures the torque and the rotation angle of the output shaft, and feeds the measured values back to the motor driving. As a result, accuracy of the positioning control and the force control for the robot can be increased.

In the articulated robot including the driving device of the present embodiment, since the wires and the pipes are suppressed from interfering with the elastic member for measuring torque and affecting the amount of deformation of the elastic member, the torque detection error can be decreased, and the accuracy of controlling the motion of each joint can be increased.

Example 1

Figure 3:
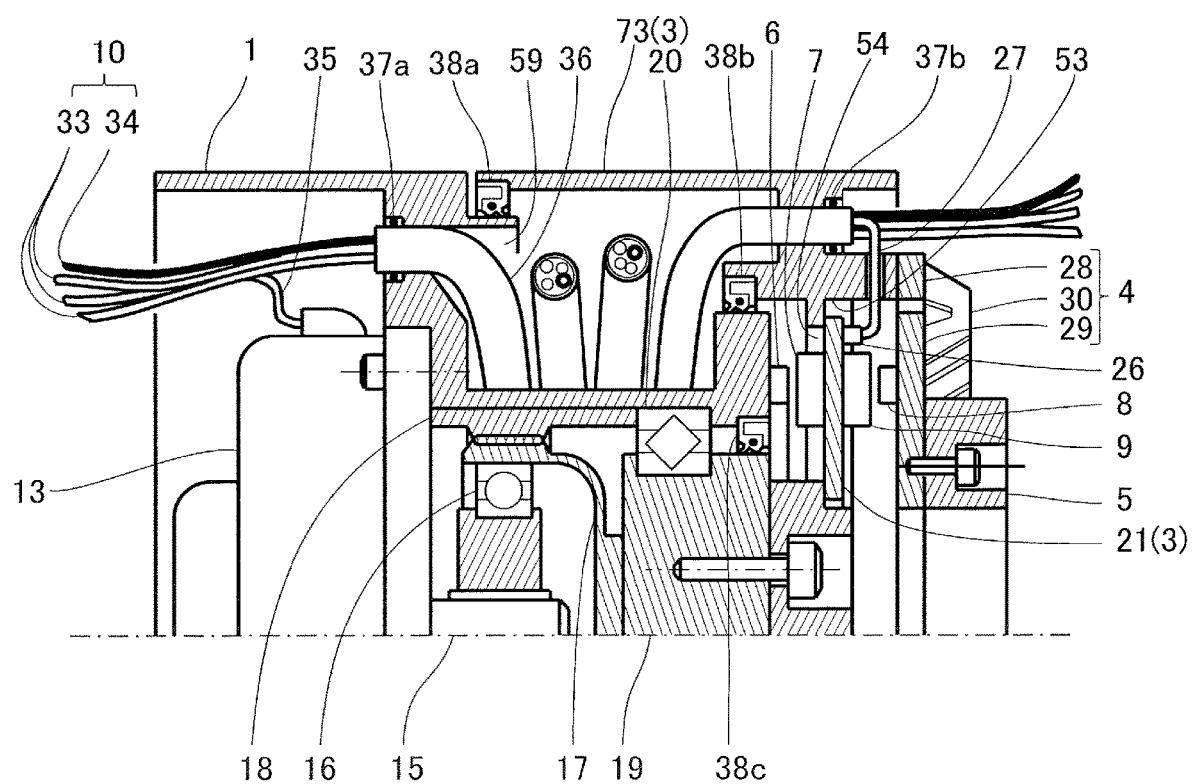
FIG. 3 is a partial cross-sectional view of a driving device of an example.
Figure 4:
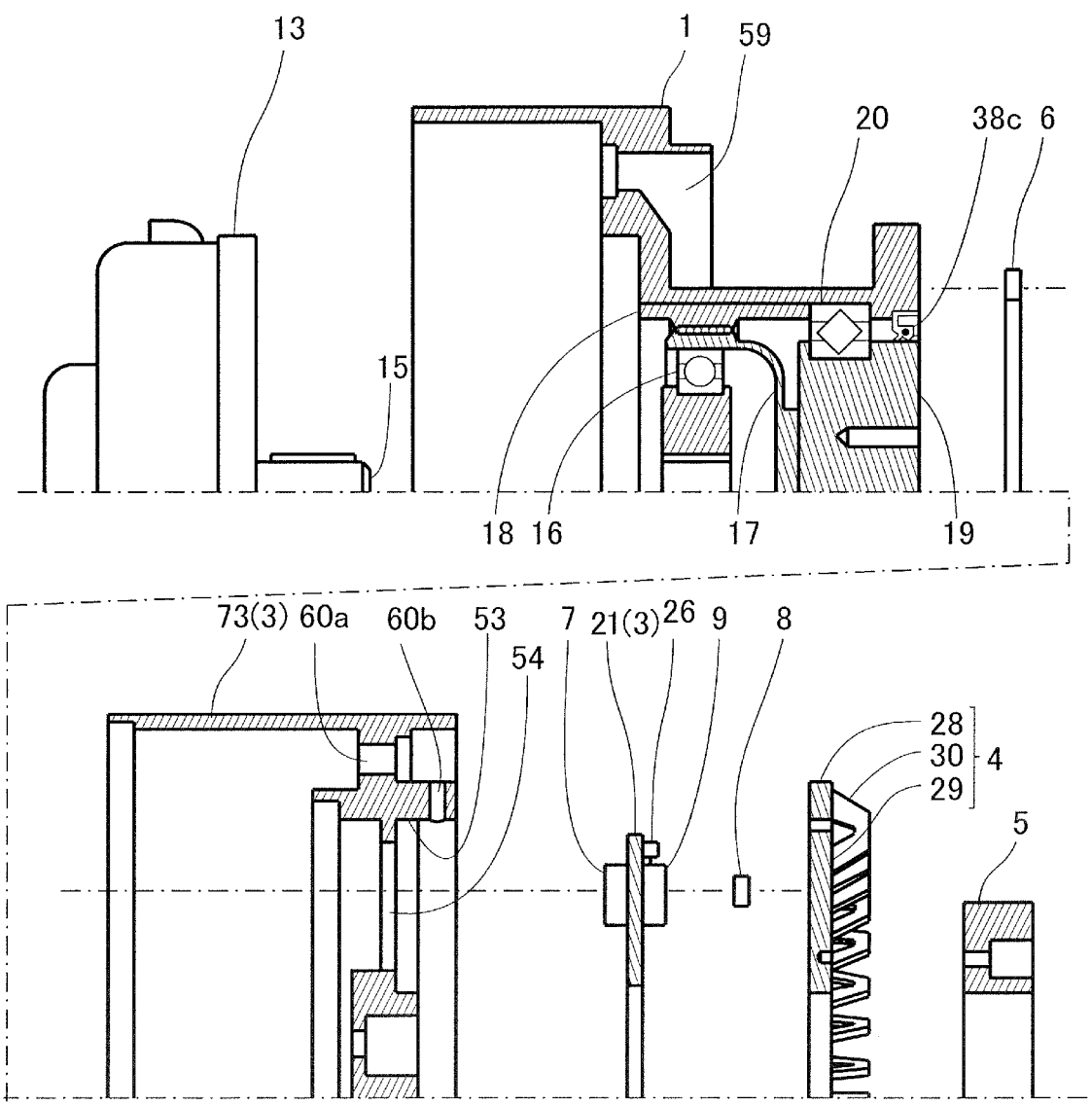
FIG. 4 is a partial cross-sectional view in which the driving device of the example is disassembled.

With reference to the accompanying drawings, Example 1 will be described as a specific example of the driving device of the present embodiment. FIG. 3 is a partial cross-sectional view of a driving device of Example 1. FIG. 4 is a partial cross-sectional view in which the driving device of Example 1 is disassembled. For example, when the driving device is used in the rotary joint $J_2$ of the articulated robot 100 of FIG. 2, the fixed member 1 is coupled with the link 201, and the output member 5 is coupled with the link 202.

Hereinafter, structures of components of the driving device will be described in a sequential manner.

Wires and Pipes

First, wires, pipes, and sealing portions will be described with reference to FIG. 3. The wires and pipes are surrounded by grease, and the grease is hermetically enclosed by the sealing portions. The bundle 10, extending from the rotary joint $J_1$ toward the rotary joint $J_3$ through the rotary joint $J_2$, includes electrical wires 33 and pipes 34. The electrical wires 33 are used for motor control and sensor signals, and the pipes 34 are used for sending compressed air to the end effector of the articulated robot 100.

Motor control lines 35 for the motor 13 of the driving device branch off from the bundle 10, and are connected to the motor 13 of the driving device. Sensor lines 27 for the sensors of the driving device branch off from the bundle 10, and are connected to a connector 26 of a sensor substrate 21 through a wiring hole 60b of the supporting member 3. The sensor substrate 21 is fixed to the supporting member 3.

The bundle 10 is required to be deformably held, so as to be able to move with the rotation of the rotary joint. In Example 1, the bundle 10 has a portion with a length enough to move with the rotation, and is deformably held by winding the portion around the fixed member 1. Specifically, the bundle 10 is inserted into a wiring tube 36, and the wiring tube 36 passes through a wiring hole 59 of the fixed member 1 and winds around the fixed member 1. With this structure, the wires and the pipes are prevented from stretching and restraining the rotation, and from being cut by the tension.

The wiring tube 36 is fixed to the fixed member 1 via an O ring 37a. In addition, the wiring tube 36 passes through a wiring hole 60a of the supporting member 3, and is fixed to the supporting member 3 via an O ring 37b. That is, the fastening member 11a of the embodiment of FIG. 1 corresponds to the O ring 37a of Example 1, and the fastening member 11b corresponds to the O ring 37b. Since the wiring tube 36 moves, it is preferable that a space around the wiring tube 36 is filled with lubricating grease for preventing wear of the wiring tube 36 caused by contact. The O rings 37a and 37b are used for sealing, to prevent the grease from leaking to the outside. Similarly, oil seals 38a and 38b are disposed between the fixed member 1 and the supporting member 3 to hermetically enclose the space in which the wiring tube 36 moves. Thus, one portion of the wires and/or the pipes is housed in the space formed between the fixed member 1 and the supporting member 3 and filled with the grease.

In Example 1, the bundle 10 is inserted into the wiring tube 36, the space around the wiring tube 36 is filled with the grease, and the space is hermetically enclosed. With this simple structure, the rotation driving device can be achieved with high reliability.

Fixed Member

The motor 13 is fixed to the fixed member 1, which is a rigid body, via a bolt. In addition, a reduction-gear fixed shaft (circular spline) 18 is fixed to the fixed member 1. In addition, a crossed roller bearing 20 is fixed to the fixed member 1, and a rotary shaft 19 (output shaft of the reduction gear) is rotatably held by the fixed member 1 via the crossed roller bearing 20. In addition, the rotation angle measurement scale 6 is fixed to the fixed member 1.

Reduction Gear

The reduction gear of Example 1 is called a strain-wave-gearing reduction gear, and includes three main components: a reduction-gear input shaft (wave generator) 16, a reduction-gear output shaft (flex spline) 17, and the reduction-gear fixed shaft (circular spline) 18.

The reduction-gear input shaft 16 is an elliptic cam having a roller bearing. The reduction-gear output shaft 17 is a cup-shaped external gear that elliptically deforms. The reduction-gear fixed shaft 18 is an internal gear whose number of teeth differs from that of the reduction-gear output shaft 17. The elliptic cam of the reduction-gear input shaft 16 presses the reduction-gear output shaft (flex spline) 17 at two end points of the major axis of the elliptic cam, and expands the reduction-gear output shaft 17 so that the reduction-gear output shaft 17 meshes with the reduction-gear fixed shaft (circular spline) 18. As described above, the number of teeth of the reduction-gear output shaft 17 differs from the number of teeth of the reduction-gear fixed shaft 18. Thus, when the reduction-gear input shaft 16 makes one rotation, the reduction-gear output shaft 17 rotates with respect to the reduction-gear fixed shaft 18 by the difference in the number of teeth. In the strain-wave-gearing reduction gear based on this principle, a typical reduction ratio is 50.

The output shaft 15 of the motor 13 is coupled with the reduction-gear input shaft 16, the reduction-gear fixed shaft 18 is fixed to the fixed member 1, and the reduction-gear output shaft 17 is fixed to the rotary shaft 19. In this structure, when the output shaft 15 of the motor 13 rotates, the reduction-gear input shaft 16 rotates, and the rotary shaft 19 that is the reduction-gear output shaft 17 rotates with respect to the fixed member 1 at a reduced rotational speed.

For preventing wear of the reduction gear, the space in which teeth of one gear contact teeth of another gear is required to be filled with lubricating grease. Thus, an oil seal 38c is disposed between the fixed member 1 and the rotary shaft 19 to prevent the grease from leaking.

Supporting Member

The supporting member 3 illustrated in FIG. 1 will be specifically described in Example 1. In Example 1, the supporting member 3 of FIG. 1 includes a sensor base 73 and the sensor substrate 21, as illustrated in FIGS. 3 and 4.

As illustrated in FIG. 4, the sensor base 73 has the wiring hole 60a and the wiring hole 60b, and is fixed to the rotary shaft 19. In addition, the elastic member 4 for measuring torque is fixed to the sensor base 73.

The sensor substrate 21 is fixed to the sensor base 73. The sensor base 73 has a concave portion 53 used to roughly position the sensor substrate 21. With the concave portion 53, the sensor substrate 21 can be easily fixed to the sensor base 73 via a screw.

The sensor base 73 has at least two window holes 54, which allow the rotation angle measurement sensor 7 to observe the rotation angle measurement scale 6.

Figure 5:
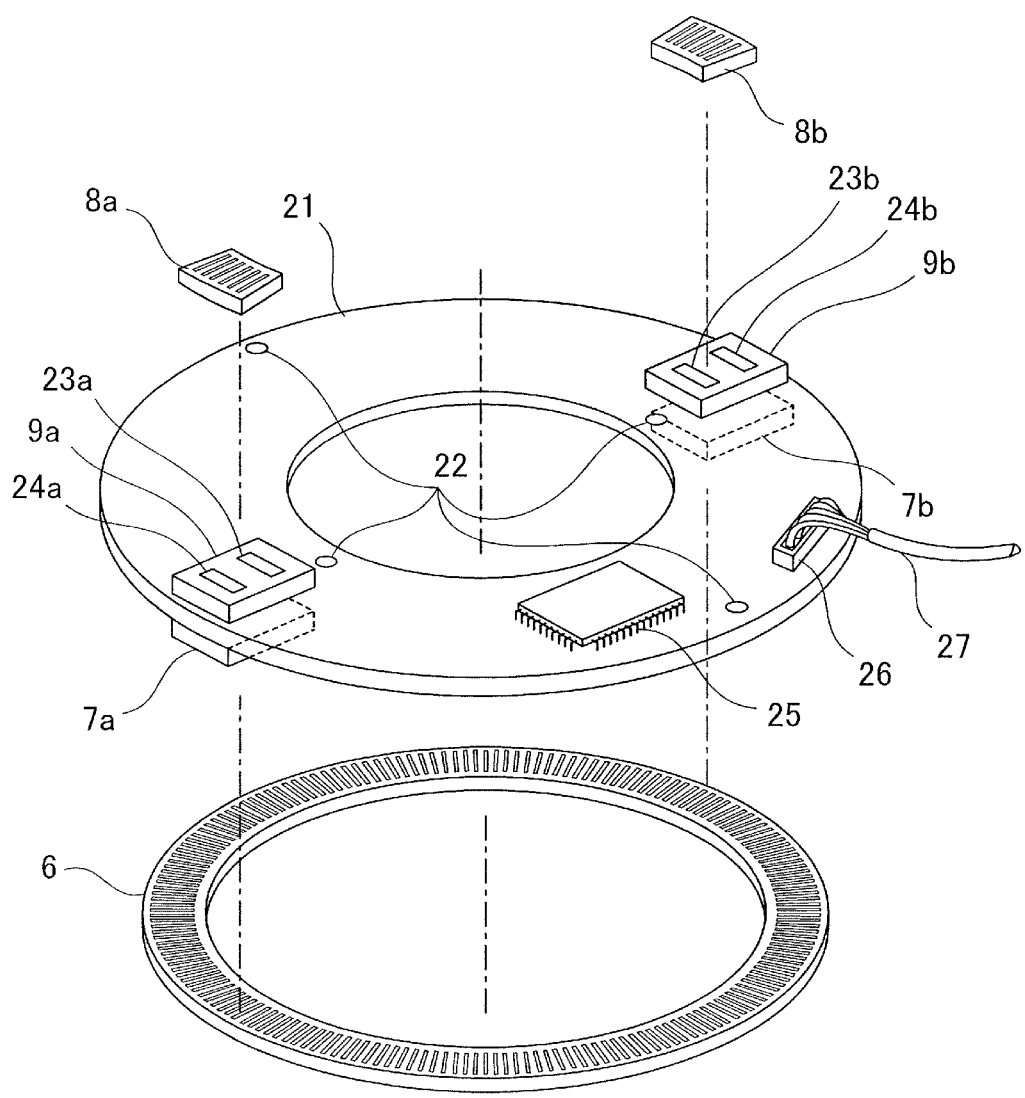
FIG. 5 is a diagram illustrating a sensor substrate of the example on which components are mounted.

With reference to FIG. 5, the sensor substrate 21, the rotation angle measurement sensor, the rotation angle measurement scale, the torque measurement sensor, and the torque measurement scale will be described on their arrangement. The sensor substrate 21 has a plurality of fixing portions 22. The fixing portions 22 are screw holes or pin holes to screw the sensor substrate 21 on the sensor base 73. The pin holes fit to positioning pins formed on the sensor base 73, and accurately position the sensor substrate 21 with respect to the sensor base 73.

The rotation angle measurement sensor 7a and the rotation angle measurement sensor 7b are mounted on the back surface of the sensor substrate 21 to measure the position of the rotation angle measurement scale 6. Preferably, the rotation angle measurement scale 6 is formed along the whole circumference of a circle, as illustrated in FIG. 5, to measure the rotation angle of the driving device in a wide range.

Although not illustrated in FIG. 5, the rotation angle measurement sensors 7a and 7b and the rotation angle measurement scale 6 face each other via the window holes 54 of the sensor base 73, as described with reference to FIGS. 3 and 4.

The torque measurement sensor 9a and the torque measurement sensor 9b are mounted on the front surface of the sensor substrate 21 to measure the position of the torque measurement scale 8a and the position of the torque measurement scale 8b. Since the torque measurement sensors 9a and 9b measure only a slight displacement of the torque measurement scales 8a and 8b, caused by slight torsional deformation of the elastic member 4, each of the torque measurement scales 8a and 8b may be disposed in one portion of the whole circumference of a circle, as illustrated in FIG. 5.

In the above description, the sensors and the scales used to detect the rotation angle and the torque have been described. For simplifying the following description, the rotation angle measurement sensors 7a and 7b may be collectively referred to as a rotation angle measurement sensor 7, and the torque measurement sensors 9a and 9b may be collectively referred to as a torque measurement sensor 9.

The rotation angle measurement sensor 7 and the torque measurement sensor 9 are optical encoders applied for measuring the displacement. Each of the sensors includes a pair of a light emitting portion and a light receiving portion. For example, the torque measurement sensor 9a includes a light emitting portion 23a and a light receiving portion 24a, and the torque measurement sensor 9b includes a light emitting portion 23b and a light receiving portion 24b. The light from the light emitting portion 23a is reflected from the torque measurement scale 8a, and the reflected light containing the positional information is received by the light receiving portion 24a, so that the position of the torque measurement scale 8a is read. Similarly, the light from the light emitting portion 23b is reflected from the torque measurement scale 8b, and the reflected light containing the positional information is received by the light receiving portion 24b, so that the position of the torque measurement scale 8b is read.

The rotation angle measurement sensors 7a and 7b are arranged at two positions on an identical circle, with one position shifted from the other position by 180 degrees. The torque measurement sensors 9a and 9b are also arranged in this manner. With this arrangement, eccentric error can be removed. The eccentric error is a displacement between the center of the rotation axis and the center around which the angle is measured. If there is an eccentric error, a sensor position changes when the joint rotates. As a result, a measurement error will be caused.

If the direction of the eccentric error is denoted by $\varphi$, the amount of the eccentric error is denoted by $\delta$, a radius at which the sensors are mounted is denoted by $R$, and the rotation angle of the joint is denoted by $\theta$, detection values $S_0$ and $S_{180}$ from the two sensors are expressed as follows.

$$s_0 = R\theta + \delta \cos(\theta + \varphi)$$

$$s_{180} = R\theta + \delta \cos(\theta + \varphi + 180)$$

In the above equations, the second terms represent the eccentric error. By using the two equations, the eccentric error can be removed from the measurement results of $\theta$, as in the following equation.

$$\theta = \frac{s_0 + s_{180}}{2R}$$

Thus, by arranging the sensors at the positions shifted from each other by 180 degrees and facing each other, the rotation angle can be measured without affected by the eccentric error. The eccentric error can be removed in both measurements performed by the rotation angle measurement sensor and the torque measurement sensor.

Next, components that are electrically mounted on the sensor substrate 21 will be described. On the sensor substrate 21, a sensor-signal processing circuit 25 is mounted to process electrical signals from the rotation angle measurement sensor 7 and the torque measurement sensor 9. In addition, the connector 26 is mounted on the sensor substrate 21 for connecting the wires 27, which include power lines and external signal lines, with lines formed on the sensor substrate 21. Thus, the connector 26 is connected with the wires 27.

In Example 1, the sensor-signal processing circuit 25 is an LSI that includes a circuit to process signals from the sensors and a data transmission-and-reception circuit, and is mounted on the sensor substrate 21. In addition, electrical-circuit lines are formed on the sensor substrate 21 through plating, printing, or the like. The electrical-circuit lines connect peripheral circuits, used for the sensors and signal processing, with the connector 26. Thus, since the rotation angle measurement sensor, the torque measurement sensor, and peripheral circuits thereof are collectively mounted on the sensor substrate 21, the driving device can be downsized and reduced in cost.

Elastic Member for Measuring Torque

Figure 6:
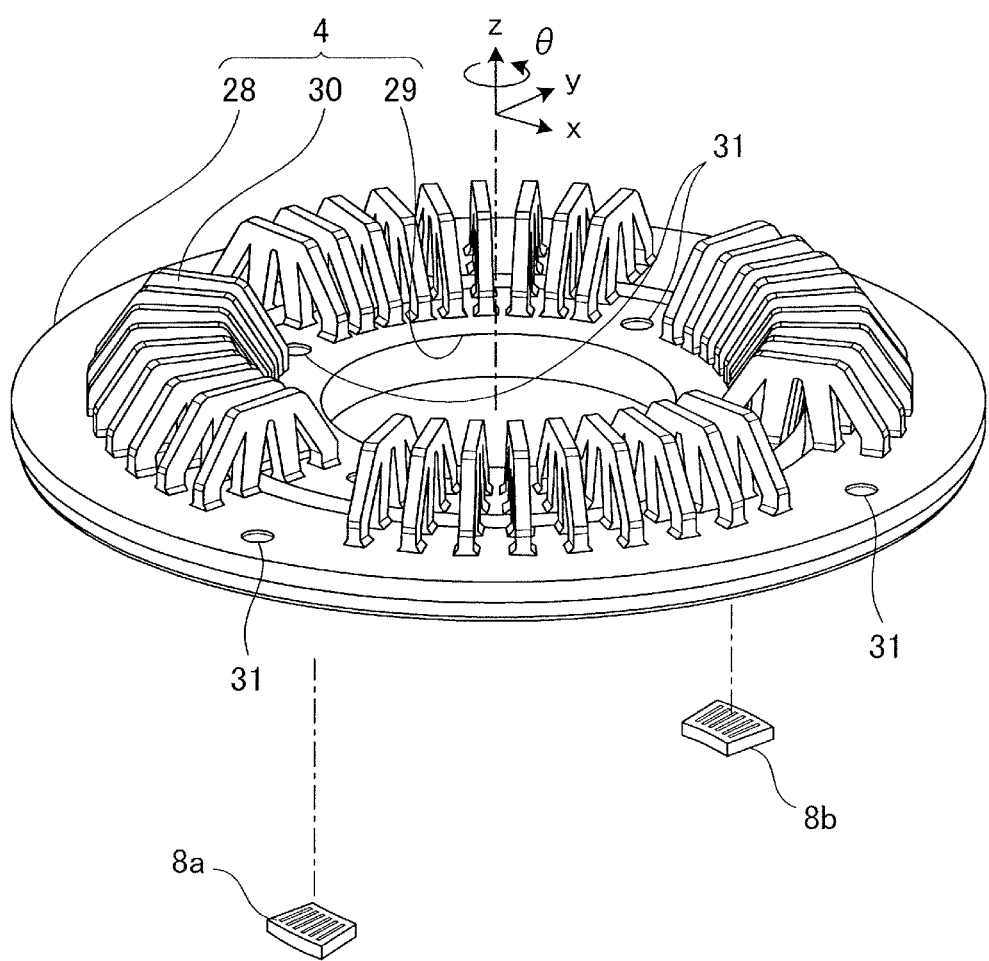
FIG. 6 is an external perspective view illustrating a shape of an elastic member of the example.

FIG. 6 is an external perspective view for illustrating a specific shape of the elastic member 4, which couples the supporting member 3 and the output member 5. The elastic member 4 for measuring torque includes an outer ring 28, an inner ring 29, and a plurality of plate-like elastic members 30. The plate-like elastic members 30 couple the outer ring 28 and the inner ring 29. Each of the plate-like elastic members 30 has a characteristic in which the rigidity obtained when the plate-like elastic member deforms in one direction in which the main surface bends is smaller than the rigidity obtained when the plate-like elastic member deforms in the other directions. Thus, as illustrated in FIG. 6, the plurality of plate-like elastic members 30 are arranged radially around the rotary shaft, and fixed to the rings such that the main surface of each plate-like elastic member is orthogonal to the rotational direction θ. As a result, each plate-like elastic member becomes soft only in the rotational direction θ around a Z direction, and hard around the other X and Y directions. Since the rigidity is large in the directions other than the rotational direction in which the torque is detected, the deformation in the non-measurement directions becomes small. As a result, the measurement error can be reduced.

The inner ring 29 and the outer ring 28 have fixing portions 31 used for fixing the rings 29 and 28 with screws or pins. In addition, the torque measurement scale 8a and the torque measurement scale 8b are fixed to the back surface of the inner ring 29. Similar to the rotation angle measurement sensors, the torque measurement scale 8a and the torque measurement scale 8b are placed at two positions shifted from each other by 180 degrees on a circle, to cancel the eccentric error. Since the torque measurement scales 8a and 8b are used to measure the slight deformation of the elastic member 4, a measurement range of each of the torque measurement scales may be small. Specifically, since the maximum amount of deformation of the elastic member 4 is slight (e.g. about 50 μm), each of the torque measurement scales may be placed on only one portion of the circle.

Detection of Rotation Angle θ and Torque T

Figure 7:
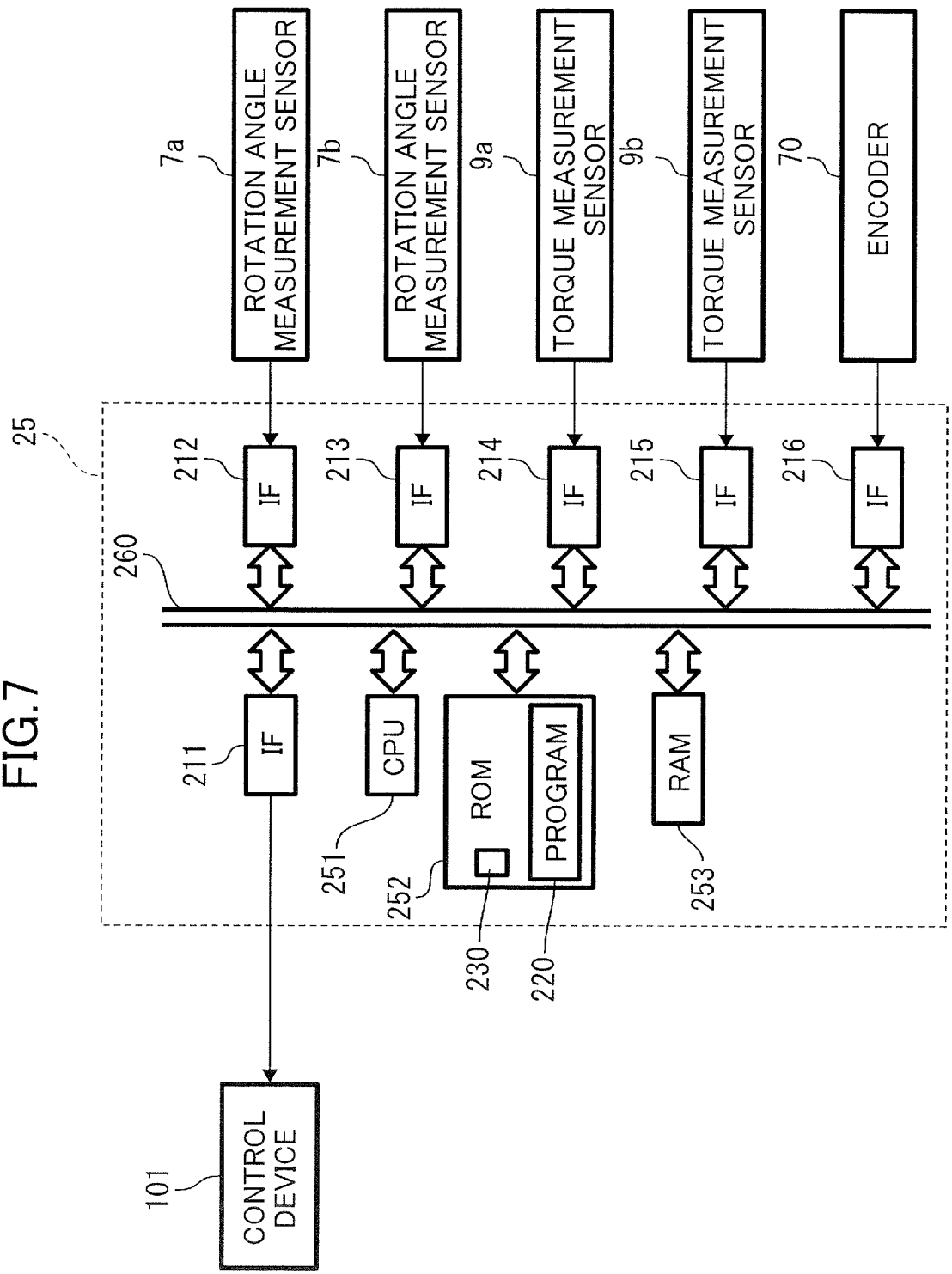
FIG. 7 is a control block diagram of a detection system of the example.

FIG. 7 is a block diagram simply illustrating a detection system of Example 1, which is used in one joint. The detection system illustrated in FIG. 7 is also used in the other joints. An encoder 70 is one example of a third sensor that outputs a signal corresponding to the rotation of the motor rotary shaft, which is the input shaft of the reduction gear 2. The encoder 70 is a rotary encoder. The encoder 70 may be an optical encoder, a magnetic encoder, or capacitance-type encoder. In addition, the encoder 70 may be an incremental-type encoder or an absolute-type encoder. Preferably, the encoder 70 is an absolute-type encoder.

The sensor-signal processing circuit 25 of FIG. 7 may be a microcomputer. The sensor-signal processing circuit 25 includes a central processing unit (CPU) 251. The sensor-signal processing circuit 25 also includes a read only memory (ROM) 252 and a random access memory (RAM) 253, as storage units. The sensor-signal processing circuit 25 further includes a bus 260 and a plurality of interfaces 211, 212, 213, 214, 215, and 216. The CPU 251, the ROM 252, the RAM 253, and the interfaces 211 to 216 are communicatively connected with each other via the bus 260.

The CPU 251 performs various processes. The ROM 252 is a storage unit storing a program 220 that causes the CPU 251 to perform the various processes. That is, the ROM 252 is a recording medium in which the program 220 is stored. The RAM 253 is a storage unit to temporarily store various data, such as results of a computing process performed by the CPU 251.

The interface 211 is connected with the control device 101. The CPU 251 sends a signal indicating a detection result, to the control device 101 via the interface 211.

The interface 212 is connected with the rotation angle measurement sensor 7a, which detects the angle of the output shaft of the reduction gear. The interface 213 is connected with the rotation angle measurement sensor 7b, which detects the angle of the output shaft of the reduction gear. The interface 212 sends a signal to the light emitting portion of the rotation angle measurement sensor 7a for causing the light emitting portion to turn light on and off, and receives a signal from the light receiving portion of the rotation angle measurement sensor 7a and outputs the signal to the CPU 251. The interface 213 sends a signal to the light emitting portion of the rotation angle measurement sensor 7b for causing the light emitting portion to turn light on and off, and receives a signal from the light receiving portion of the rotation angle measurement sensor 7b and outputs the signal to the CPU 251.

The interface 214 is connected with the torque measurement sensor 9a, which detects the torque of the joint. The interface 215 is connected with the torque measurement sensor 9b, which detects the torque of the joint. The interface 214 sends a signal to the light emitting portion of the torque measurement sensor 9a for causing the light emitting portion to turn light on and off, and receives a signal from the light receiving portion of the torque measurement sensor 9a and outputs the signal to the CPU 251. The interface 215 sends a signal to the light emitting portion of the torque measurement sensor 9b for causing the light emitting portion to turn light on and off, and receives a signal from the light receiving portion of the torque measurement sensor 9b and outputs the signal to the CPU 251. The interface 216 is connected with the encoder 70, which detects the rotation angle of the motor 13. The interface 216 receives a signal from the encoder 70, and outputs the signal to the CPU 251. In this manner, the CPU 251 acquires current positional information data from the sensors 7a, 7b, 9a, and 9b, and the encoder 70, at predetermined time intervals.

Figure 8:
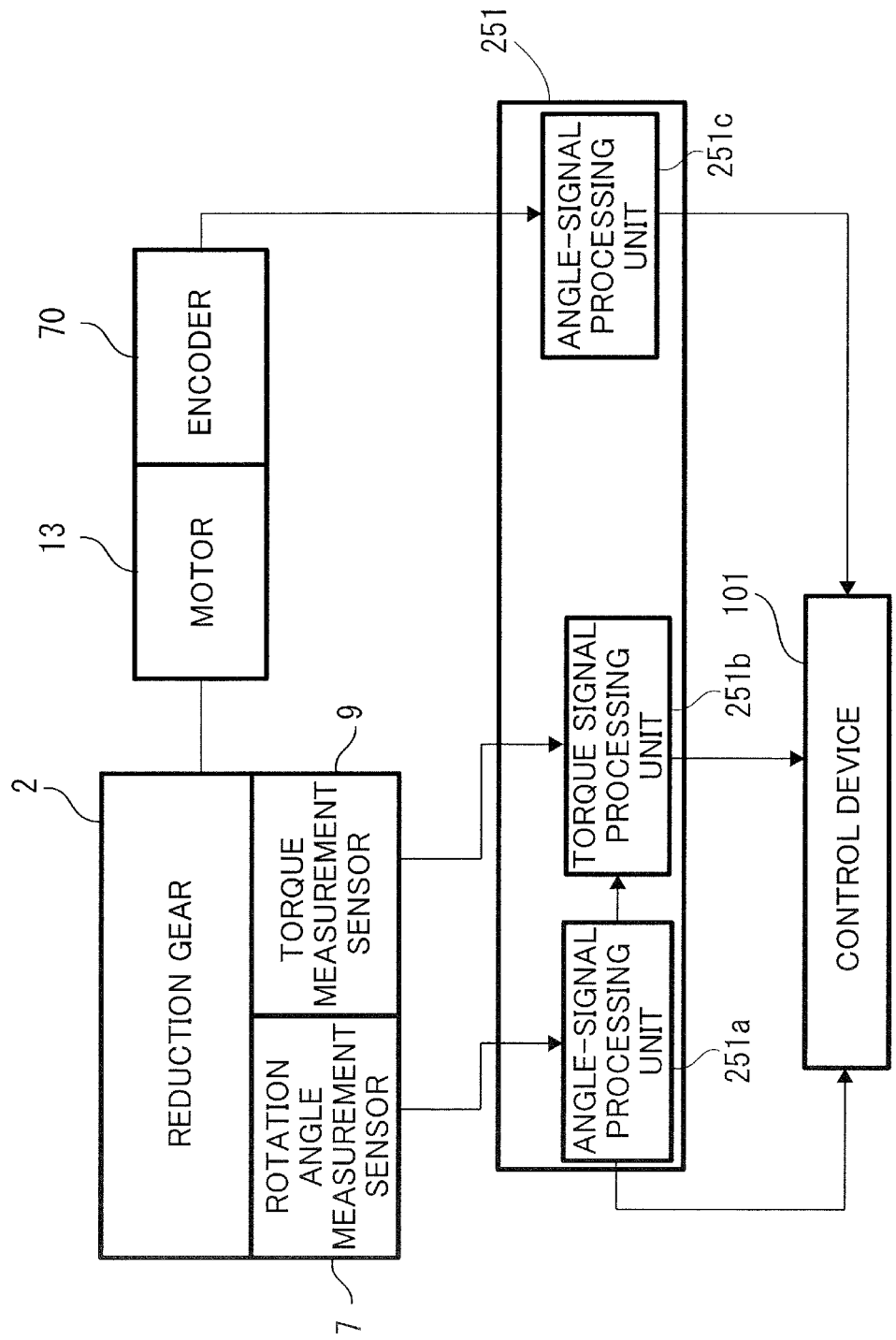
FIG. 8 is a control block diagram of a robot of the example.

FIG. 8 is a block diagram of a control system of the articulated robot 100 of the embodiment. When executing the program 220, the CPU 251 illustrated in FIG. 7 functions as an angle-signal processing unit 251a, a torque-signal processing unit 251b, and an angle-signal processing unit 251c, as illustrated in FIG. 8. The angle-signal processing unit 251a determines the angle of the joint, that is, the relative angle of the supporting member 3 to the fixed member 1. The torque-signal processing unit 251b determines the torque applied to the joint, that is, the torque applied between the supporting member 3 to which the outer ring 28 of the elastic member 4 is fixed, and the output member 5 to which the inner ring 29 of the elastic member 4 is fixed. The angle-signal processing unit 251c determines the rotation angle of the rotary shaft of the motor 13, which is the input shaft of the reduction gear 2. The CPU 251 outputs computation results from these processing units, to the control device 101. The angle-signal processing unit 251a calculates the rotation angle θ of the output member 5 from the following equation, by using the angle $E_1$ and the angle $E_2$. The angle $E_1$ is a rotation angle measured by the rotation angle measurement sensor 7 disposed on the sensor substrate 21, and the angle $E_2$ is an angle measured by the torque measurement sensor 9. The torque-signal processing unit 251b calculates the torque T from the following equation, by using the torsional rigidity K of the elastic member 4.

$$\theta = E_1 + E_2$$

$$T = KE_2$$

In Example 1, however, since the sensors 7a, 7b, 9a, and 9b are disposed on the output-shaft side of the reduction gear 2, errors are added to the calculation results. The errors are displacement errors caused by deformation of the reduction gear 2. In particular, since the reduction gear 2 is a strain-wave-gearing reduction gear in Example 1, the errors are significantly produced. Hereinafter, the description thereof will be specifically made.

Figure 9:
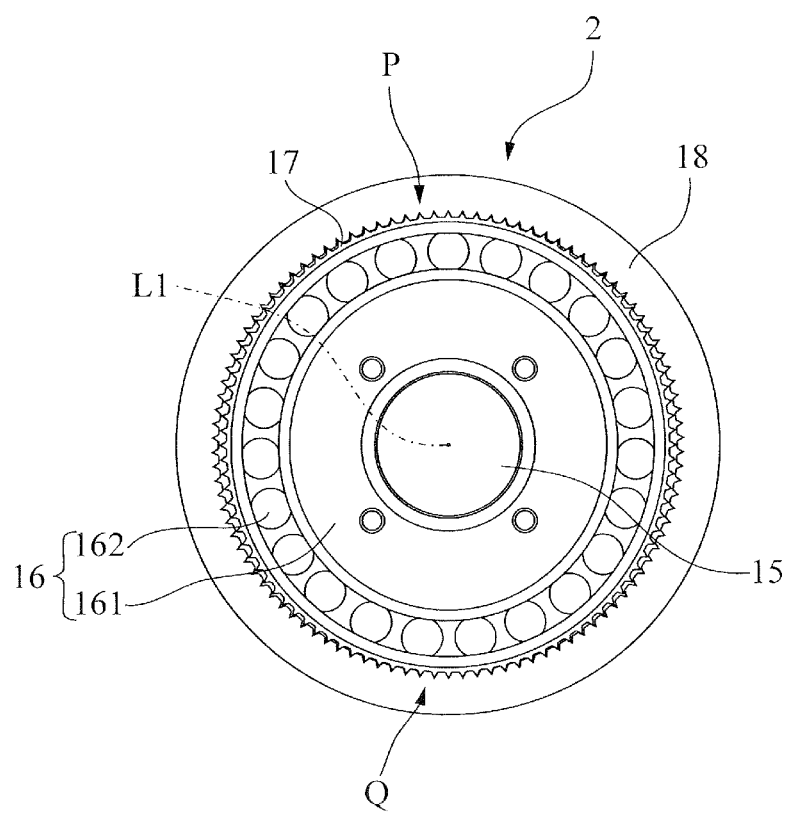
FIG. 9 is a front view of a reduction gear 2 of the example.

FIG. 9 is a front view of the reduction gear 2 of Example 1. The reduction gear 2 of FIG. 9 includes a wave generator, which is the reduction-gear input shaft 16 coupled with the rotary shaft of the motor 13. The reduction gear 2 also includes a flex spline, which is the reduction-gear output shaft 17. The reduction gear 2 further includes a circular spline, which is the reduction-gear fixed shaft 18.

The wave generator includes an elliptic cam 161, and a roller bearing 162 disposed on the outer circumferential surface of the elliptic cam 161. The rotary shaft of the motor 13 is coupled with the elliptic cam 161 of the wave generator.

The flex spline includes a cup-shaped thin body portion. On the outer surface of the body portion, a plurality of teeth is formed in the circumferential direction. The body portion is elliptically deformed by the wave generator. The circular spline has an internal gear whose number of teeth is larger than that of the flex spline.

The wave generator presses the flex spline, and expands the flex spline into an elliptic shape. As a result, as illustrated in FIG. 9, the flex spline meshes with the circular spline at two points, P and Q, positioned on the major axis of the elliptic cam 161. While the wave generator makes one rotation, the flex spline makes two periodical movements in the radial direction. The periodical movement is transmitted to the supporting member 3 fixed to the output shaft of the reduction gear 2, moving the sensors 7a, 7b, 9a, and 9b, and causing the detection error in the sensors 7a, 7b, 9a, and 9b. That is, since the periodical movement is transmitted to the elastic member 4 disposed on the output-shaft side of the reduction gear 2, the transmitted periodical movement will be detected as torque even though no torque is transmitted.

Figure 10A:
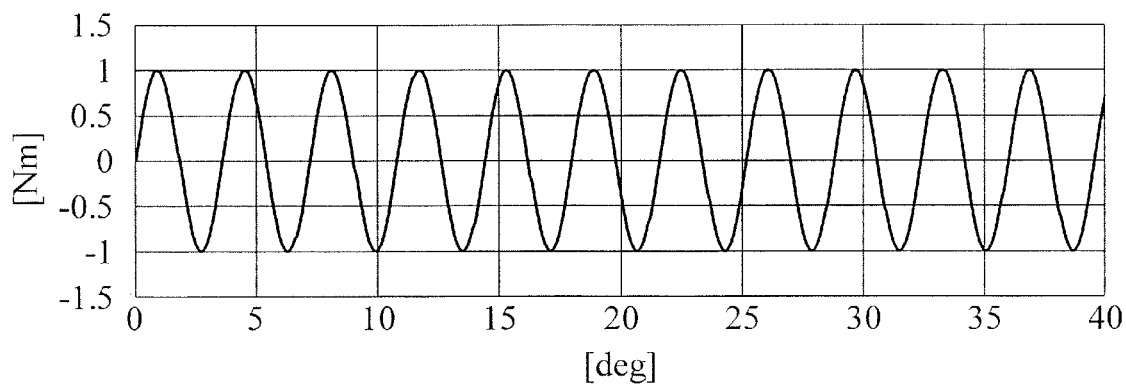
FIG. 10A is a graph illustrating detection error component values of torque in the example.
Figure 10B:
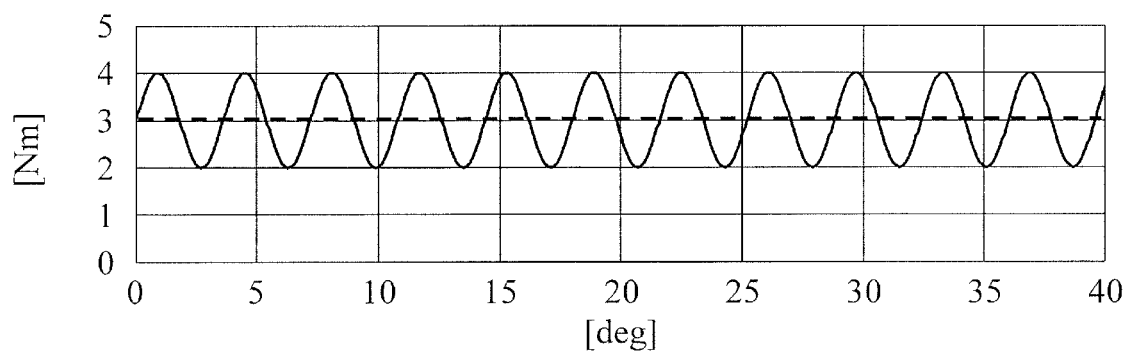
FIG. 10B is a graph illustrating torque values including a detection error component in the example.

FIG. 10A is a graph illustrating detection error component values of torque in Example 1. FIG. 10B is a graph illustrating torque values including the detection error component in Example 1. In FIGS. 10A and 10B, the horizontal axis represents the rotation angle of the output shaft of the reduction gear 2, and the vertical axis represents the torque. FIG. 10A illustrates a load state in which the torque applied to the joint is zero, that is, a no-load state. FIG. 10B illustrates a load state in which a torque of 3 Nm is applied to the joint. In FIGS. 10A and 10B, the torque value is a value (detected value) determined from signals from the torque measurement sensors 9a and 9b, and the rotation angle value is determined from signals from the rotation angle measurement sensors 7a and 7b.

As illustrated in FIG. 10A, the detection error component value of torque forms a waveform (torque ripple) that changes periodically with respect to the rotation angle of the output shaft of the reduction gear 2. In FIG. 10A, the detection error component value of torque changes in a range from −1 to +1 Nm. When a load of 3 Nm is applied to the joint, the detected value of torque is added with the detection error component value of torque. Specifically, as illustrated in FIG. 10B, the detected value of torque forms a waveform that changes with respect to the applied load of 3 Nm (indicated by a dotted line).

When the reduction ratio of the reduction gear 2 is 50, the output shaft of the reduction gear 2 makes 1/50 rotation while the input shaft of the reduction gear 2 makes one rotation. That is, while the sensors 7a, 7b, 9a, and 9b disposed on the output-shaft side of the reduction gear 2 make one rotation, 100 detection error components are produced (i.e. 100=2× 50). Thus, in Example 1, the CPU 251 determines a torque value in which the error component is cancelled.

Figure 11:
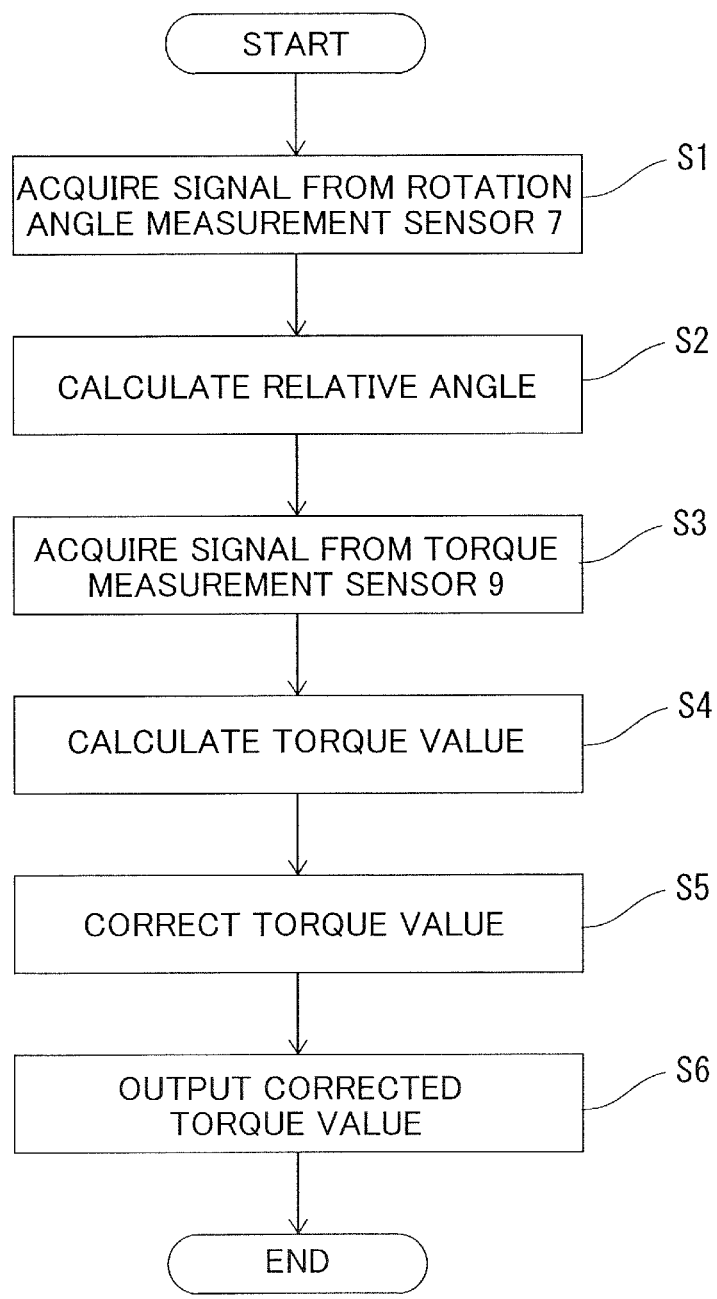
FIG. 11 is a flowchart illustrating a detection method in the example.

Hereinafter, a method to determine the torque value, that is, a detection method of the torque will be described. The CPU 251 corrects the torque value, as follows, by using current angle information. FIG. 11 is a flowchart illustrating a detection method of Example 1. Here, the ROM 252 illustrated in FIG. 7 stores data 230 in advance that indicates a relationship between the relative angle that is angle information obtained by the rotation angle measurement sensor 7, and the correction value that is the torque error component. That is, the data 230 has values illustrated in FIG. 10A, and has been determined in advance through an experiment or a simulation. The data 230 may be table data, or may be obtained through a computing equation.

The angle-signal processing unit 251a obtains signals outputted from the rotation angle measurement sensor 7a and the rotation angle measurement sensor 7b (S1). The angle-signal processing unit 251a uses the signals obtained from the two rotation angle measurement sensors 7a and 7b, and determines a relative angle of the supporting member 3 to the fixed member 1, which is an angle of the output shaft of the reduction gear 2 (S2).

The torque-signal processing unit 251b obtains signals outputted from the torque measurement sensor 9a and the torque measurement sensor 9b (S3). The torque-signal processing unit 251b uses the signals obtained from the two torque measurement sensors 9a and 9b, and determines a torque applied to the joint, that is, a torque applied between the supporting member 3 and the inner ring 29 (S4).

The determined torque value contains an error component, that is, a torque ripple, as illustrated in FIG. 10B. The torque-signal processing unit 251b corrects the torque value in accordance with the relative angle determined by the angle-signal processing unit 251a (S5).

Specifically, in Step S5, the torque-signal processing unit 251b corrects the torque value by using a correction value associated with the relative angle and determined from the data 230 stored in the ROM 252 (FIG. 7). That is, the torque-signal processing unit 251*b* refers to the data 230, and reads the correction value corresponding to the relative angle determined in Step S2. Then, the torque-signal processing unit 251*b* subtracts the correction value from the torque value obtained in Step S4. Here, the sign of the correction values stored in the ROM 252 may be reversed. That is, the phase of the signal illustrated in FIG. 10A may be shifted by 180 degrees (a half phase) for inverting the signal. In this case, the torque-signal processing unit 251*b* adds the correction value to the torque value obtained in Step S4.

Figure 10C:
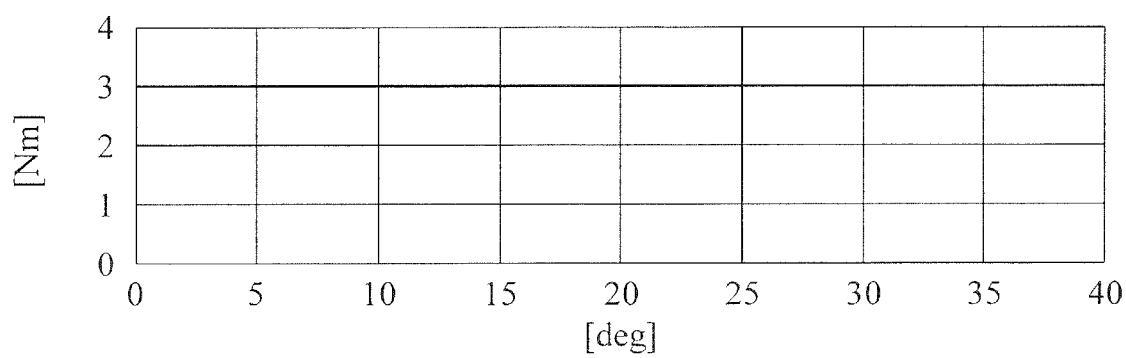
FIG. 10C is a graph illustrating a corrected torque value in the example.

FIG. 10C is a graph illustrating a corrected torque value. As illustrated in FIG. 10C, the corrected torque value forms a waveform with no torque ripple. The torque-signal processing unit 251*b* outputs the corrected torque value to the control device 101 (S6).

The control device 101 controls the articulated robot 100 in accordance with the received torque value, to cause the articulated robot 100 to assemble a workpiece (not illustrated) to another workpiece. With this operation, the workpiece is assembled into a product.

The joints $J_1$ to $J_6$ of the articulated robot 100 have load because the load of the links and the load applied in an assembly operation are applied to the joints. Furthermore, the load applied to the joints $J_1$ to $J_6$ always changes, depending on the posture of the articulated robot 100, or the like. Since the reduction gear 2 elastically deforms in accordance with the load, the rotation angle of the output shaft of the reduction gear 2 changes depending on the load, even though the rotation angle of the input shaft of the reduction gear 2 is constant.

In Example 1, the positional information used for correcting torque values is information based on signals from the rotation angle measurement sensor 7 disposed on the output-shaft side of the reduction gear 2. The rotation angle measurement sensor 7 and the torque measurement sensor 9 are disposed on the output-shaft side of the reduction gear 2, and the positional information that changes in accordance with the load is indicated by an output result from the rotation angle measurement sensor 7. That is, since torque values can be corrected by using the positional information that changes in accordance with the load, the detection error component of torque can be more reliably removed, and thus the torque value can be determined with high accuracy.

In Example 1, since all the wires and the pipes are fixed to the fixed member 1 and the sensor base 73, the force produced by the wires and the pipes due to the rotation of the joint is applied to the portion between the fixed member 1 and the sensor base 73. Thus, the force produced by the wires and the pipes is prevented from being applied to the elastic member 4 and affecting the deformation of the elastic member 4. That is, the pull force and the frictional force produced by the wires, the pipes, and the sealing portions are not factors that involve measurement errors to the angle $E_2$ measured by the torque measurement sensor 9. As a result, the torque applied to the output member 5 can be measured with high accuracy.

In addition, since the driving device of Example 1 uses signals outputted from the sensor used for measuring the rotation angle of the reduction gear and from the sensor for measuring the torque applied to the output member, and calculates the rotation angle θ of the output shaft by summing the signals for controlling the motor, high control accuracy for the rotation angle can be achieved.

In Example 1, since the deformation of the elastic member is measured as an angle by using a signal from the optical encoder, the torque can be measured with higher accuracy and a larger dynamic range than those of an analog sensor such as a magnetostriction type. For example, when a deformation of 50 µm of the elastic member is measured with an encoder having a resolution of 1 nanometer, a dynamic range of 50,000 levels can be easily achieved. Compared to the above-described analogue sensor, the accuracy of the encoder can be 50 times higher than that of the analogue sensor, for example. In addition, since influence of the force produced by the wires, the pipes, and the sealing portions can be reduced, the torque can be detected with high accuracy.

Furthermore, the driving device of Example 1 measures each of the rotation angle and the torque by using a relative displacement (angle) between two objects (the rotation angle θ is determined by the angle $E_1$ and the angle $E_2$, and the torque T is determined by the angle $E_2$). Thus, since both the rotation angle and the torque are measured by using the identical physical quantity, part of the rotation angle measurement sensor and part of the torque measurement sensor can be disposed on the identical member (which is the supporting member 3 including the sensor substrate 21, in Example 1). As a result, the driving device can be downsized.

In Example 1, the rotation angle measurement sensors 7*a* and 7*b* and the torque measurement sensors 9*a* and 9*b* are fixed to the identical supporting member 3 via the sensor substrate 21. Thus, the deformation of the reduction gear 2 will equally affect the rotation angle measurement sensors 7*a* and 7*b* and the torque measurement sensors 9*a* and 9*b*.

In addition, when viewed from a direction of an axis L1 of FIG. 9, the rotation angle measurement sensor 7*a* and the torque measurement sensor 9*a* overlap with each other, and the rotation angle measurement sensor 7*b* and the torque measurement sensor 9*b* overlap with each other. Thus, when the supporting member 3 thermally expands, the rotation angle measurement sensor 7*a* and the torque measurement sensor 9*a* are equally displaced, and the rotation angle measurement sensor 7*b* and the torque measurement sensor 9*b* are equally displaced.

Thus, a correction value can be subtracted from the output from the torque measurement sensor 9 affected by the ambient environment (such as the temperature or the humidity), by using the output from the rotation angle measurement sensor 7 affected by the identical ambient environment. As a result, the output from the torque measurement sensor 9 can be corrected without being affected by the ambient environment, and the torque value can be determined with high accuracy without affected by the ambient environment.

In Example 1, when viewed from the direction of the axis L1 of FIG. 9, the rotation angle measurement sensor 7*a* and the torque measurement sensor 9*a* overlap with each other, and the rotation angle measurement sensor 7*b* and the torque measurement sensor 9*b* overlap with each other. Thus, the calculation for the correction is simple because the correction value has only to be subtracted from (or added to) the torque value, and because any complicated calculation on phase is not necessary. Here, although the rotation angle measurement sensor 7*a* preferably overlaps with the torque measurement sensor 9*a* when viewed from the direction of the axis L1, the rotation angle measurement sensor 7*a* may be slightly shifted from the torque measurement sensor 9*a*. Preferably, the amount of shift between the rotation angle measurement sensor 7*a* and the torque measurement sensor 9*a* is in a range of angle from −5 to +5 degrees around the axis L1. The same holds true for the rotation angle measurement sensor 7b and the torque measurement sensor 9b.

Example 2

Next, with reference to the accompanying drawings, Example 2 will be described as another specific example of the driving device of the present embodiment. Example 2 differs from Example 1 in the configuration of the elastic member and the method of fixing the elastic member.

Figure 12:
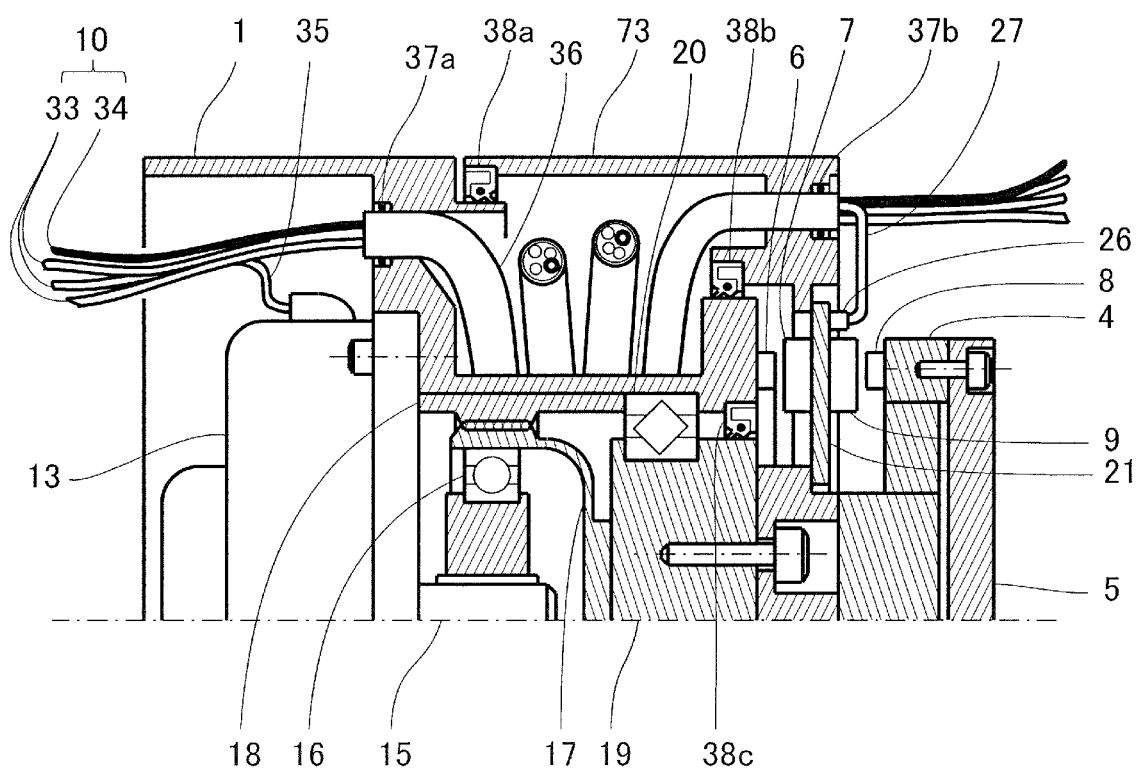
FIG. 12 is a partial cross-sectional view of a driving device of an example.
Figure 13:
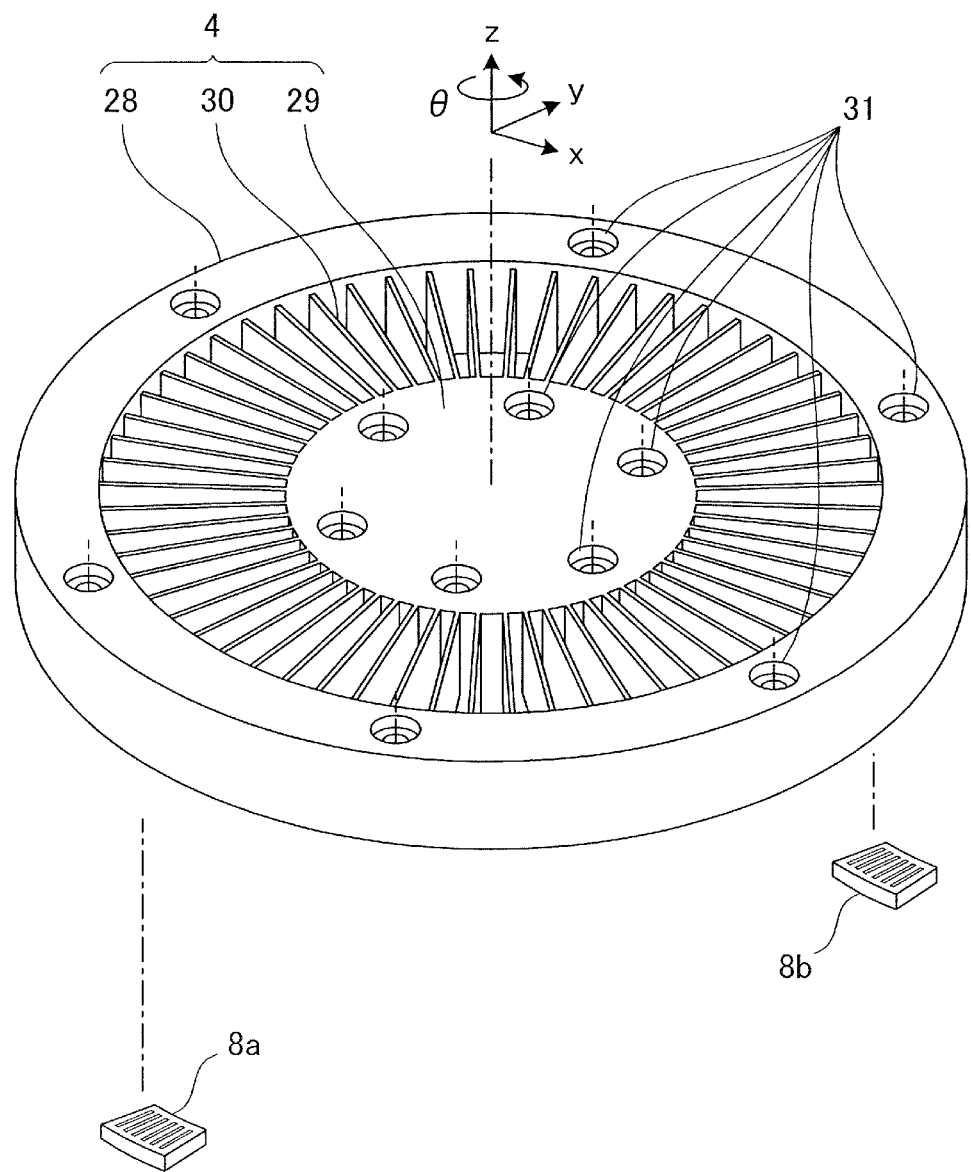
FIG. 13 is an external perspective view illustrating a shape of an elastic member of the example.

FIG. 12 is a partial cross-sectional view of a driving device of Example 2. FIG. 13 is an external perspective view for illustrating a specific shape of an elastic member 4. Although the outer ring of the elastic member is fixed to the sensor base in Example 1, the outer ring is fixed to the output member in Example 2. In Example 2, the description for the same components as those of Example 1 will be omitted as much as possible, and the description for components different from those of Example 1 will be made.

As illustrated in FIGS. 12 and 13, the elastic member 4 of Example 2 has a structure in which the outer ring 28 and the inner ring 29, both having fixing bolt holes or the fixing portions 31, are coupled with each other via a plurality of plate-like elastic members 30. The plate-like elastic members 30 are radially arranged such that the main surface of each plate-like elastic member is orthogonal to the rotational direction θ. The inner ring 29 is fixed to the supporting member 3, and the outer ring 28 is fixed to the output member 5. In addition, the torque measurement scale 8a and the torque measurement scale 8b are fixed to the back surface of the outer ring 28. Since the other configuration is the same as that of Example 1, the description thereof will be omitted.

In Example 2, the design for the elastic member 4 is easy and simple. In contrast, since the elastic member of Example 1 illustrated in FIG. 6 deforms in a complicated manner due to the combination of the bending deformation and the torsional deformation, the elastic member of Example 1 is required to be designed in size and shape by trial and error, by using the finite element method or the like. In Example 2, however, since the design can be performed in consideration of the bending deformation of a simple rectangular flat plate, the solution can be easily obtained. However, since the number of parameters that can be changed in design is small, the optimum range for the shape is limited.

In Example 2, since the scales for measuring torque are fixed to the outer ring, the diameter of the output shaft can be advantageously reduced, compared to that of Example 1. In addition, since the annular components having different diameters are concentrically arranged with space formed therebetween, and the annular components are coupled with each other via the plurality plate-like elastic members which are arranged radially and whose main surfaces are orthogonal to the rotational direction θ, the torque sensor and the driving device can be thinned.

Example 3

Next, Example 3 will be described with reference to FIGS. 14 to 18.

Example 3 differs from the above-described examples in that the elastic member is formed through the selective laser sintering, by using a three-dimensional forming apparatus. Such a forming method is disclosed in Japanese Patent Application Publication No. 2018-100445, for example. In Example 3, the description for the same components as those of the other examples will be omitted as much as possible, and the description for components different from those of the other examples will be made.

Figure 14:
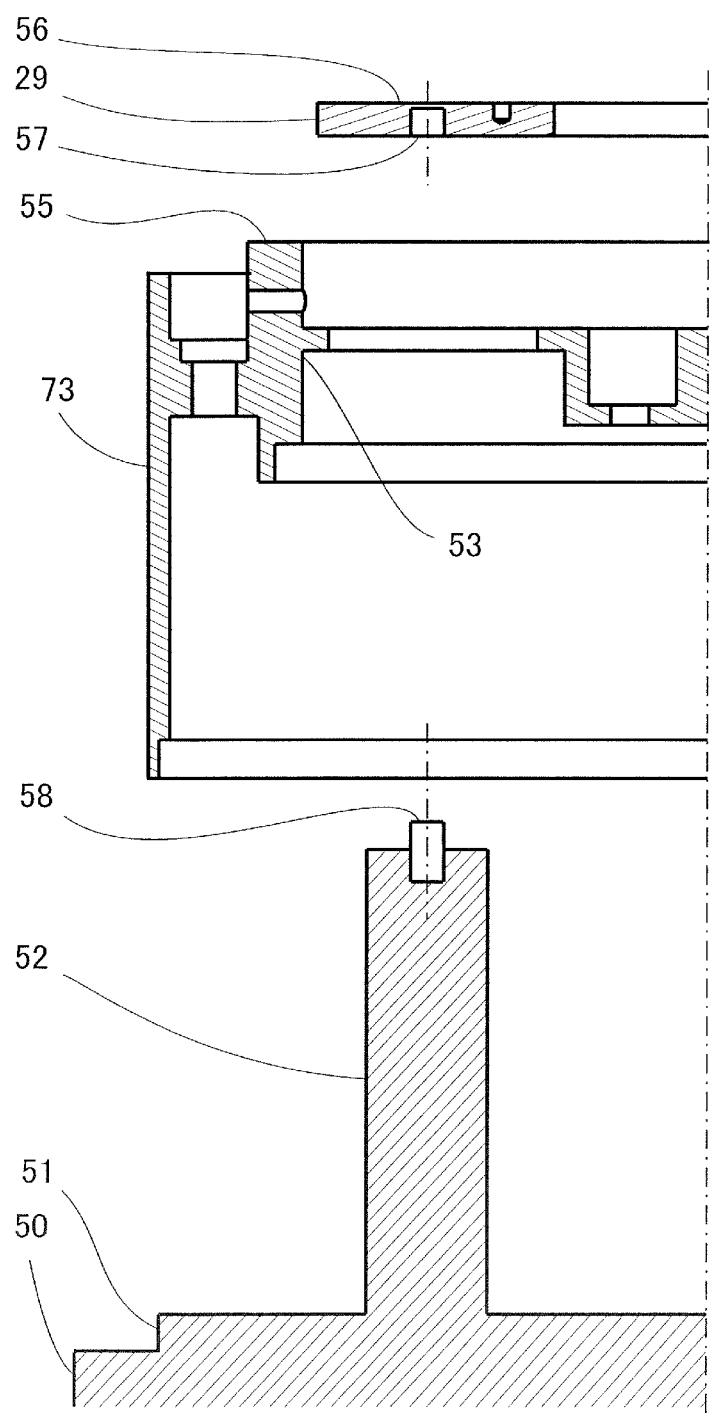
FIG. 14 is a diagram illustrating a preparatory process of production in an example.

First, as illustrated in FIG. 14, a forming jig 50, the sensor base 73, and the inner ring 29 are prepared.

The forming jig 50 is used to attach the sensor base 73 and the inner ring 29 to a three-dimensional forming apparatus (not illustrated). The forming jig 50 includes a fit portion 51 that fits to the sensor base 73, and a pillar 52 that fixes the inner ring 29 of the elastic member 4. On an upper surface of the sensor base 73, a flat forming start surface 55 is formed in advance. The sensor base 73 has the concave portion 53 used for holding the sensor substrate 21. The concave portion 53 is formed also in a position opposite, in the vertical direction, to the position in the cross section of FIG. 3 or 4 of the above-described Example 1, to assemble the sensor substrate 21 on which the sensors are mounted can be assembled to the sensor base 73, also from below.

In addition, a flat forming start surface 56 is formed in advance on the upper surface of the inner ring 29, and a positioning pin hole 57 is formed in the lower surface of the inner ring 29.

Figure 15:
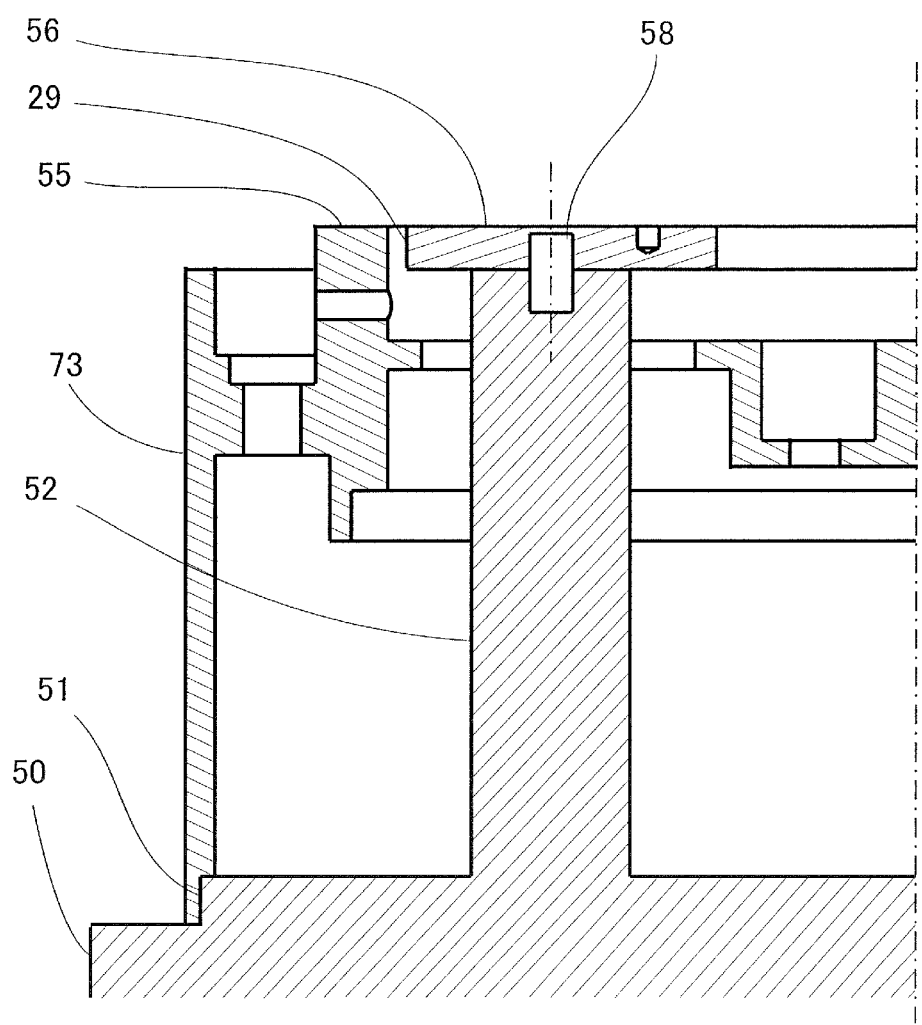
FIG. 15 is a diagram illustrating a state in which a sensor base and an inner ring of the example are attached to a forming jig.

As illustrated in FIG. 15, the sensor base 73 and the inner ring 29 of the elastic member 4 are attached to the forming jig 50. The sensor base 73 is fit and fixed to the fit portion 51 of the forming jig 50, and the inner ring 29 is fixed to the pillar 52 of the forming jig 50 via the pin 58 and a screw (not illustrated). In this manner, the sensor base 73 and the inner ring 29 are attached to the forming jig 50 such that the forming start surface 55 of the sensor base 73 and the forming start surface 56 of the inner ring 29 are flush with each other.

Next, a forming process using the forming apparatus will be described with reference to FIGS. 16A to 16D.

The forming apparatus, which is a selective laser sintering apparatus, spreads forming powder 301, contained in a hopper 334, on a forming base 330 by controlling an electromagnetic valve 335 for forming a powder layer 301a; and flattens the surface of the powder layer 301a by causing a smoothing plate (squeegee) 336 to scan the surface of the powder layer 301a. After forming the first layer of the powder layer 301a on the forming base 330, the forming apparatus irradiates a portion 301b of the first layer with a laser beam 304 to sinter and solidify the portion 301b.

Figure 16A:
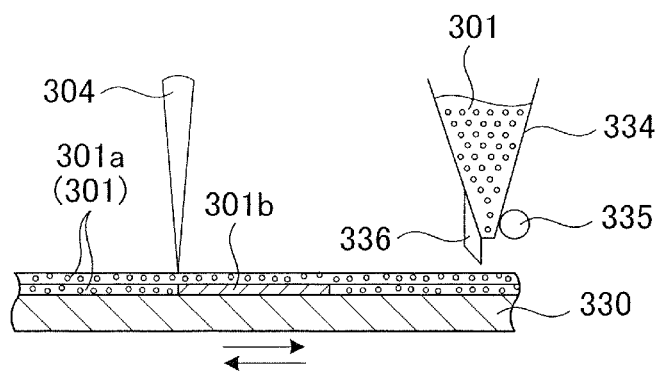
FIG. 16A is a diagram illustrating a process in which laser is emitted in a three-dimensional forming method of the example.
Figure 16B:
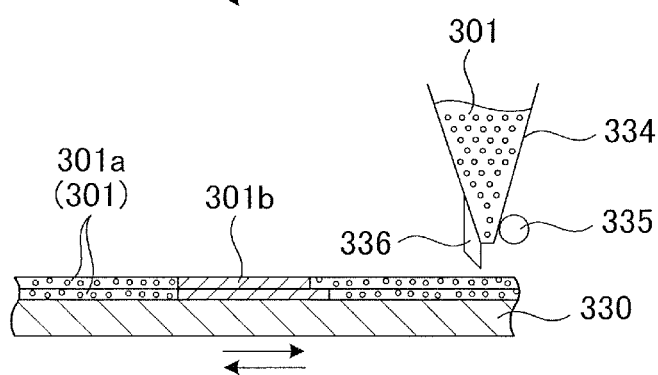
FIG. 16B is a diagram illustrating a state in which the second layer is formed in the three-dimensional forming method of the example.

Similarly, the forming apparatus forms the second layer of the powder layer 301a on the first layer, and irradiates a portion 301b of the second layer with the laser beam 304, as illustrated in FIG. 16A, for sintering the portion 301b of the second layer as illustrated in FIG. 16B.

Figure 16C:
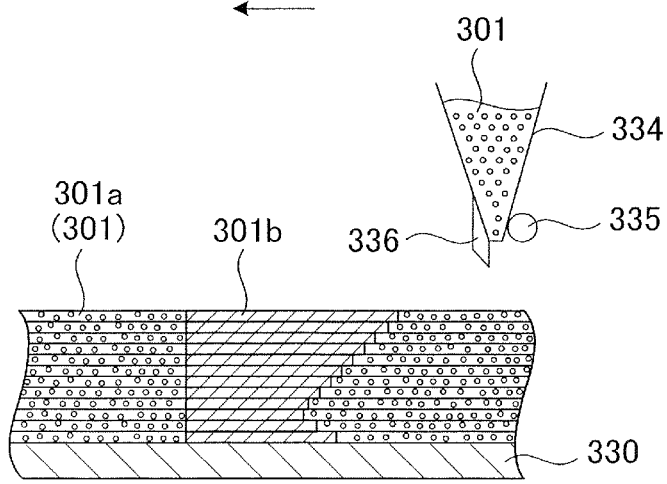
FIG. 16C is a diagram illustrating a state in which a laminated body is formed in the three-dimensional forming method of the example.
Figure 16D:
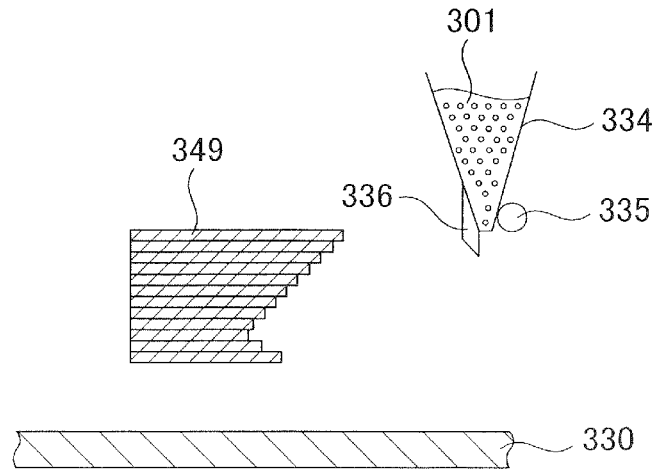
FIG. 16D is a diagram illustrating a state in which a formed object is taken out in the three-dimensional forming method of the example.

In this manner, the forming apparatus repeats the process to form a powder layer and the process to sinter a portion of the powder layer by irradiating the portion with the laser beam; and forms a laminated member in which the sintered portions 301b are laminated, as illustrated in FIG. 16C. Finally, a formed object 349 is taken out from the forming base 330.

FIGS. 16A to 16D schematically illustrate the forming process for simply describing the forming process. In practice, the elastic member is formed by using a manufacturing method disclosed in Japanese Patent Application Publication No. 2018-100445. Specifically, the forming jig 50 of FIG. 14 to which the sensor base 73 and the inner ring 29 have been attached is set to the forming apparatus, and the plate-like elastic members 30 of the elastic member 4 are three-dimensionally formed on the forming start surfaces, so as to couple the sensor base 73 and the inner ring 29.

Figure 18:
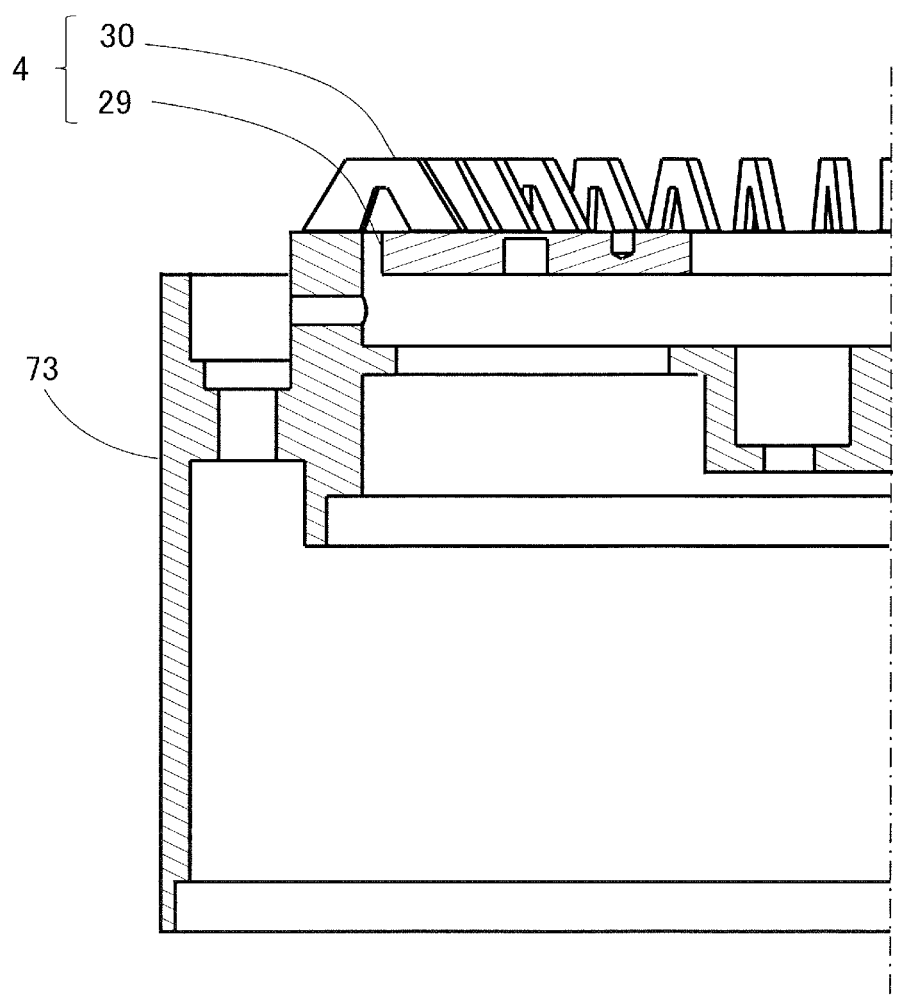
FIG. 18 is a diagram illustrating a state in which the elastic member of the example is formed and the forming jig is removed.

FIG. 18 illustrates the plate-like elastic members 30 formed in this manner. When the powder layer is sintered with the laser beam, the material of the forming start surface of the sensor base 73 and the material of the forming start surface of the inner ring 29 are partly melted. As a result, the plate-like elastic members 30 formed in this manner and the foundation members for the plate-like elastic members 30 are firmly joined as one body. That is, in a joining portion between the plurality of plate-like elastic members 30 and the supporting member 3, the material of the plate-like elastic members 30 and the material of the supporting member 3 are melted and firmly joined with each other; in a joining portion between the plurality of plate-like elastic members 30 and the output member 5, the material of the plate-like elastic members 30 and the material of the output member 5 are melted and firmly joined with each other.

Figure 17:
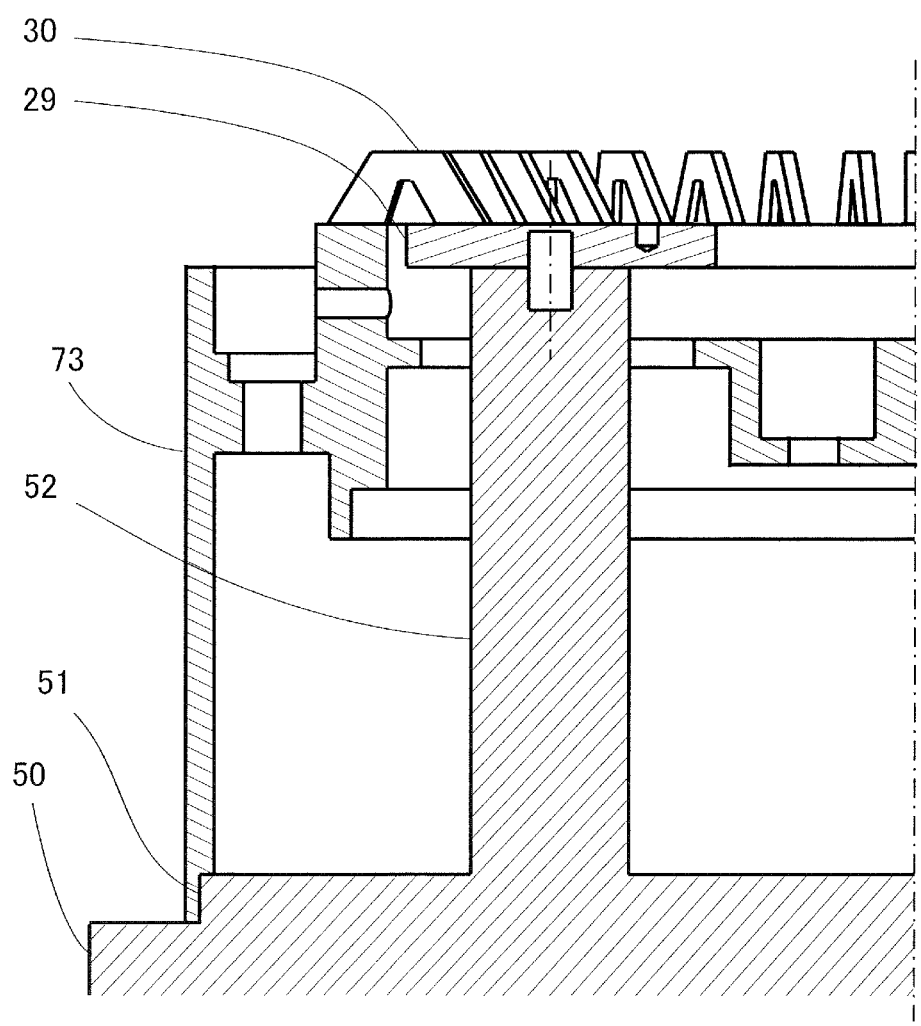
FIG. 17 is a diagram illustrating a state in which an elastic member of the example is formed.

The plate-like elastic members 30 having the shape and structure as illustrated in FIG. 17 are not easy to manufacture by using a processing method such as machining. This is because when an opening is formed in a center portion of each of the plate-like elastic members 30 by machining, a cutting blade used in the machining will interfere with the sensor base 73 or the inner ring 29. In contrast, in the selective laser sintering of Example 3, even such an opening can be easily formed. In addition, since all the powder material is consumed for forming the plate-like elastic members 30 alone, the method using the selective laser sintering is economical because no waste is produced, unlike the method using cutting.

When the forming jig 50 is removed, the elastic member 4 in which the sensor base 73, the inner ring 29, and the plate-like elastic members 30 are formed as one body can be obtained as illustrated in FIG. 18. In addition, since the forming jig 50 is reusable, it is economical.

In Example 3, since the plate-like elastic members 30 can be formed by using a three-dimensional forming apparatus, any complicated shape that is difficult for machining to form can be easily formed. In addition, since the flexibility in design for the elastic member can be increased, a higher-performance elastic member can be achieved. For example, since an elastic member having a higher rigidity in the non-torque detecting direction than in the torque detecting direction can be achieved, the torque detection error can be reduced.

In Example 3, since the plate-like elastic members 30 of the elastic member 4 can be directly formed on the sensor base 73, a thin rotary joint can be achieved. In addition, since the elastic member is formed by using the selective laser sintering, the flexibility in shape design is increased, and the number of parameters used in optimum design can be significantly increased more than that in machining, allowing a higher-performance elastic member to be manufactured. As a result, a torque sensor with high accuracy can be achieved at low cost, increasing the control accuracy for the driving device.

Example 4

Figure 19:
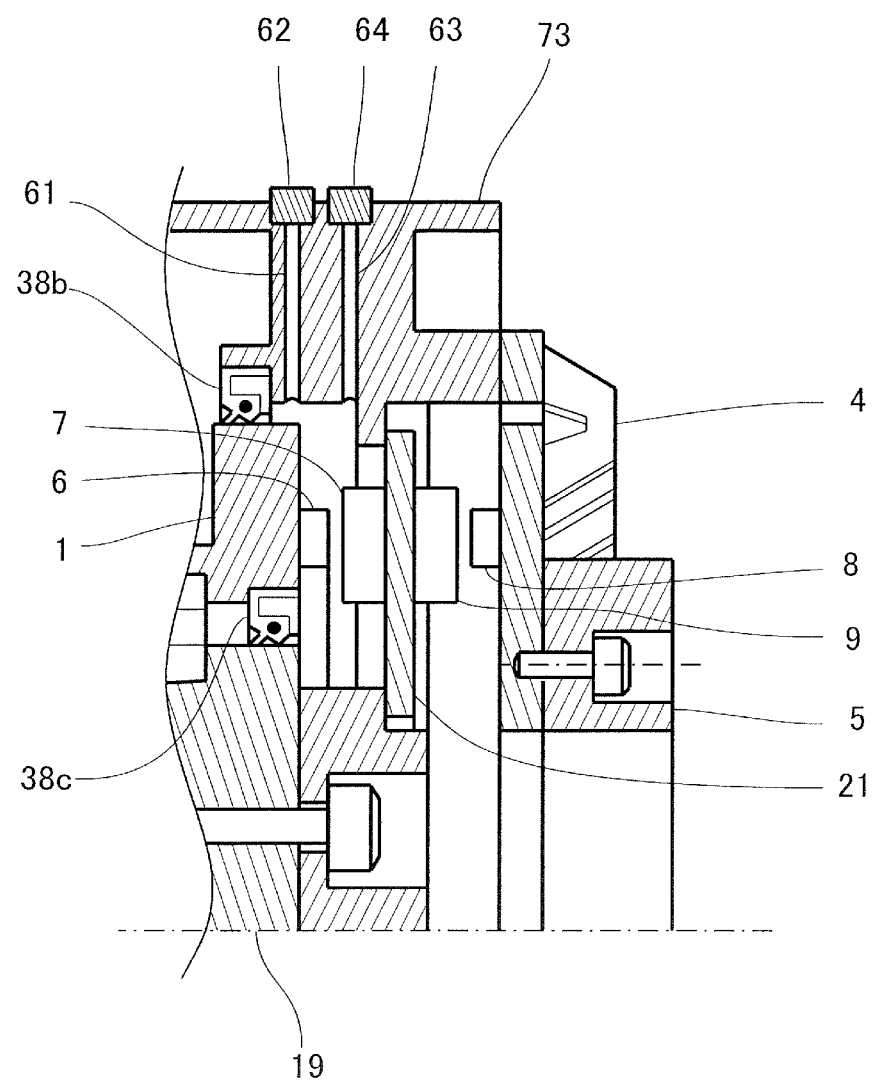
FIG. 19 is a partial cross-sectional view of a driving device of an example.

Next, Example 4 will be described. FIG. 19 illustrates a partial cross-sectional view in Example 4. Example 4 differs from the other examples in that an inlet is formed for cleaning. That is, in Example 4, the inlet is formed to flow cleaning fluid to a space via which the rotation angle measurement scale and the rotation angle measurement sensor for the reduction gear face each other. In Example 4, the description for the same components as those of the other examples will be omitted as much as possible, and the description for components different from those of the other examples will be made.

As described in the other examples, the rotation angle measurement sensor and the torque measurement sensor are optical encoders. Thus, when dust or dirt is put on the rotation angle measurement scale, the optical encoder may not operate normally. For this reason, it is necessary to clean the rotation angle measurement scale as appropriate. However, if the driving device is disassembled, cleaned, and reassembled every time the rotation angle measurement scale is cleaned, the maintenance is troublesome.

In Example 4, a mechanism to blow clean air is formed in the vicinity of the rotation angle measurement sensor, and the dust or dirt is blown off by the clean air. As a result, the rotation angle measurement scale can be cleaned without disassembling the joint.

As illustrated in FIG. 19, the space via which the rotation angle measurement scale 6 and the rotation angle measurement sensor 7 face each other is a closed space surrounded by the fixed member 1, the rotary shaft 19, the sensor base 73, the sensor substrate 21, the oil seal 38b, and the oil seal 38c. In Example 4, an air inlet 61 and an air outlet 63 are formed in the sensor base 73, and sealed by sealing screws 62 and 64 when the driving device is normally operated.

When the space is cleaned, the sealing screws 62 and 64 are removed, then the air inlet 61 is connected to a compressed-air source (not illustrated), and then the clean air is supplied to the space and discharged from the air outlet 63. In this manner, the air is blown onto the rotation angle measurement scale 6 and the rotation angle measurement sensor 7, and thereby the dust or dirt on the rotation angle measurement scale 6 and the rotation angle measurement sensor 7 is blown off for cleaning.

In Example 4, since the driving device is not disassembled and reassembled in the cleaning, the time and labor for the maintenance can be significantly reduced. As a result, the driving device can be increased in reliability and operation rate, and decreased in running costs. Here, although the air outlet 63 is formed in the sensor base 73 in Example 4, the air outlet 63 may be formed in the sensor substrate 21. In addition, although the clean air is supplied to the space in Example 4, inert liquid such as fluorine-based liquid may be supplied to the space. In addition, another flow channel to flow the cleaning fluid may be formed in the space in which the torque measurement scale and the torque measurement sensor are formed for measuring torque.

Example 5

Figure 20:
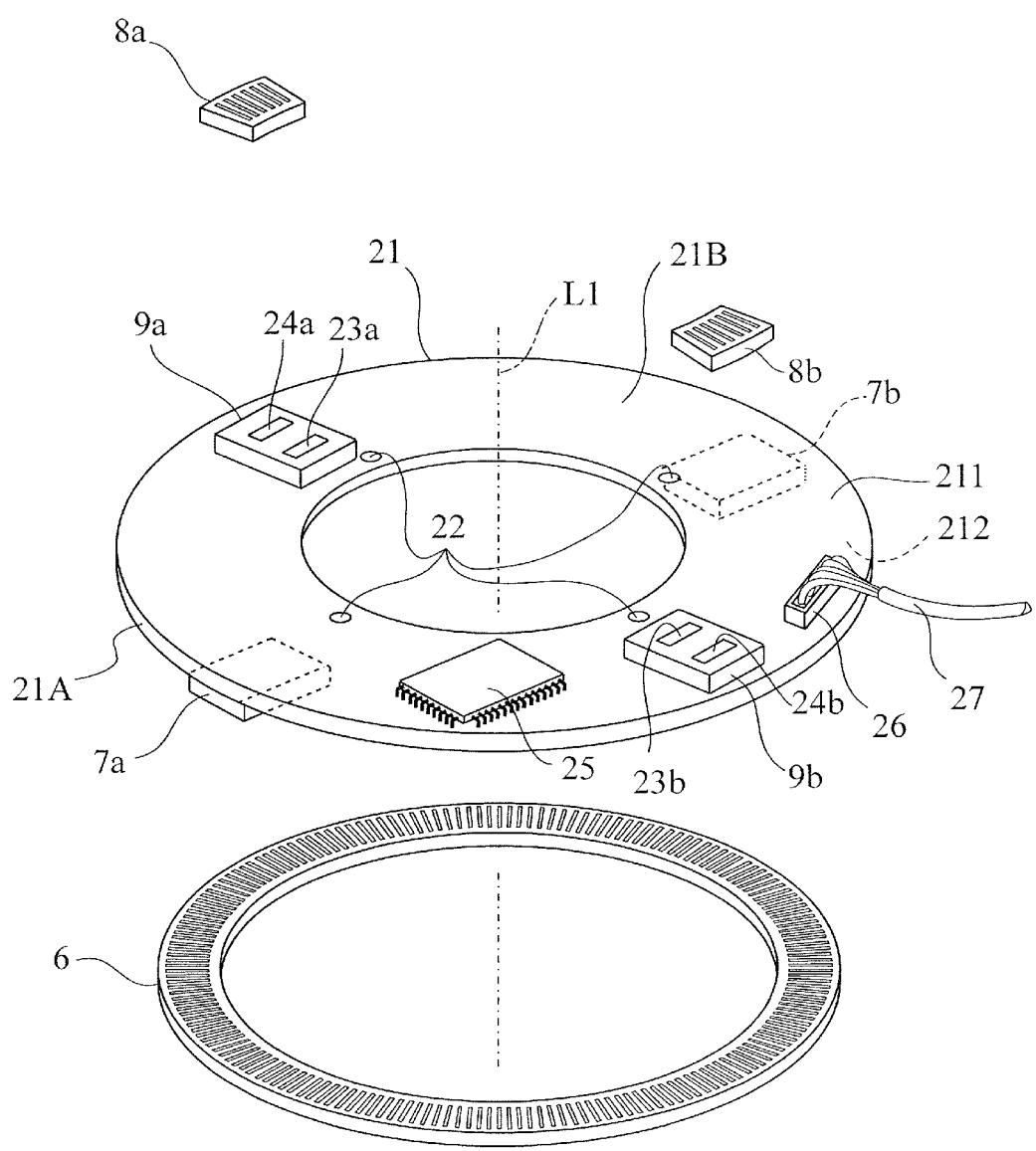
FIG. 20 is a diagram illustrating a sensor substrate of an example on which components are mounted.

Next, Example 5 will be described. FIG. 20 is a perspective view in Example 5. In the above-described Example 1, when viewed from the direction of the axis L1, the rotation angle measurement sensor 7a disposed on the back surface of the sensor substrate 21 and the torque measurement sensor 9a disposed on the front surface of the sensor substrate 21 overlap with each other, and the rotation angle measurement sensor 7b disposed on the back surface of the sensor substrate 21 and the torque measurement sensor 9b disposed on the front surface of the sensor substrate 21 overlap with each other. Example 5 differs from Example 1 in the arrangement of the sensors, and is the same as Example 1 in the other configuration. Thus, the description for the same configuration as Example 1 will be omitted.

In Example 5, the driving device includes the rotation angle measurement sensor 7a that is one example of a first sensor, and the rotation angle measurement sensor 7b that is one example of the first sensor. The driving device also includes the torque measurement sensor 9a that is one example of a second sensor, and the torque measurement sensor 9b that is one example of the second sensor. The rotation angle measurement sensors 7a and 7b are disposed on a main surface 21A of the sensor substrate 21. The torque measurement sensors 9a and 9b are disposed on a main surface 21B of the sensor substrate 21.

In Example 5, when viewed from the direction of the axis L1, the rotation angle measurement sensor 7a and the torque measurement sensor 9a are shifted from each other by about 90 degrees in the rotational direction of the supporting member 3, and the rotation angle measurement sensor 7b and the torque measurement sensor 9b are shifted from each other by about 90 degrees in the rotational direction of the supporting member 3. That is, the rotation angle measurement sensor 7a and the torque measurement sensor 9a are shifted from each other by about 90 degrees around the axis L1, and the rotation angle measurement sensor 7b and the torque measurement sensor 9b are shifted from each other by about 90 degrees around the axis L1. Here, the shift angle may be 90 degrees, or may be slightly deviated from 90 degrees. Preferably, the amount of deviation is equal to or larger than −5 degrees and equal to or smaller than +5 degrees. That is, the shift angle is preferably in a range of 90±5 degrees.

Figure 21:
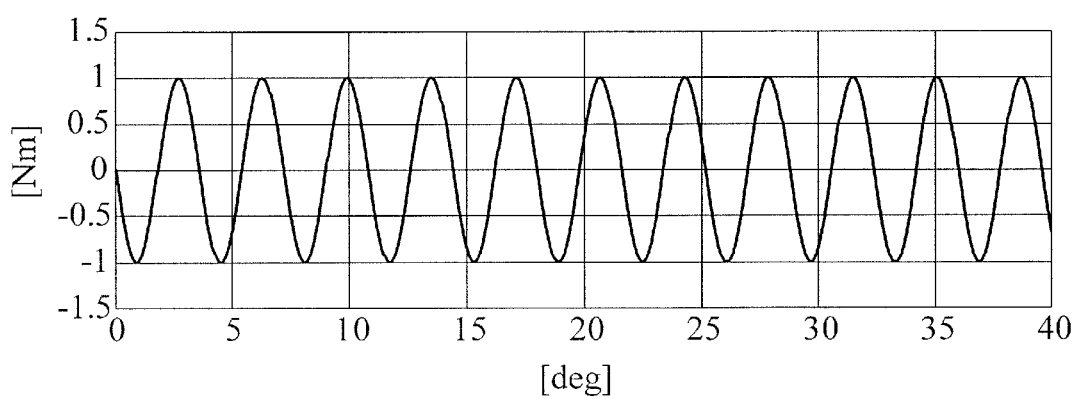
FIG. 21 is a graph illustrating torque detection in the example.

FIG. 21 is a graph illustrating detection error component values of torque in Example 5. In FIG. 21, the horizontal axis represents the rotation angle of the output shaft of the reduction gear 2, and the vertical axis represents the torque. FIG. 21 illustrates a state in which the torque applied to the joint is zero, that is, a no-load state. In FIG. 21, the torque value is a value (detected value) determined from signals from the torque measurement sensors 9a and 9b. In addition, the rotation angle value illustrated in FIG. 21 is determined from signals from the rotation angle measurement sensors 7a and 7b.

As illustrated in FIG. 21, the detection error component value of torque forms a waveform (torque ripple) that changes periodically with respect to the rotation angle of the output shaft of the reduction gear 2. In FIG. 21, the detection error component value of torque changes in a range from −1 to +1 Nm. In Example 5, since the sensors are shifted by 90 degrees unlike Example 1, the waveform of FIG. 21 is shifted from the waveform of FIG. 10A by 180 degrees, and thus has the opposite phase.

In Example 5, the data 230 stored in the ROM 252 of FIG. 7 is data on the waveform (torque ripple) illustrated in the graph of FIG. 21. Thus, the CPU 251 adds, in Step S5 of FIG. 11, a torque value obtained in Step S4, with a correction value based on the data 230; and thereby determines a corrected torque value T. Here, the sign of the correction values stored in the ROM 252 may be reversed. That is, the phase of the signal illustrated in FIG. 21 may be shifted by 180 degrees for inverting the signal. In this case, the CPU 251 subtracts the correction value from the torque value obtained in Step S4.

Thus, even though the sensors are shifted by 90 degrees unlike Example 1, the torque value can be determined with high accuracy as in Example 1.

Example 6

Next, Example 6 will be described. The hardware configuration of Example 6 is the same as that of Example 5. Example 6 differs from Example 5 in a process performed by the CPU 251, that is, in the contents of the program 220. Thus, the description for the hardware configuration will be omitted. In addition, Example 6 differs from Example 5 in the correction process of Step S5 of the flowchart of FIG. 11, which has been described in Example 1.

In Example 6, the description will be made for a case where the input shaft of the reduction gear 2 can be regarded as kept at a constant angle. When the output shaft of the reduction gear 2 is applied with a torque load, the reduction gear 2 deforms. The amount of deformation can be measured by the rotation angle measurement sensor 7 disposed at the output side of the reduction gear 2.

Specifically, in FIG. 8, the torque-signal processing unit 251b acquires a relative angle value from the angle-signal processing unit 251a, and determines the amount of deformation with respect to a reference value. Then, the torque-signal processing unit 251b converts the amount of deformation to a torque value by using the rigidity coefficient of the reduction gear 2, and sets the torque value as a torque correction value. The rigidity coefficient of the reduction gear 2 is a constant value, and is stored in advance in the ROM 252. The torque-signal processing unit 251b then adds the correction value to a torque value, and thereby determines a corrected torque value.

In this manner, the torque-signal processing unit 251b corrects a torque value by using a relative angle value and the rigidity coefficient of the reduction gear 2. Since the rigidity is small if the reduction gear 2 is a strain-wave-gearing reduction gear, the torque can be measured with the sensitivity enough to correct the torque.

Here, although Example 6 has been described for a configuration in which the sensors are arranged as illustrated in FIG. 20 of Example 5, the sensors of Example 6 may be arranged as in Example 1.

Example 7

Next, Example 7 will be described. The hardware configuration of Example 7 is the same as that of Example 5. Example 7 differs from the other examples in a process performed by the CPU 251, that is, in the contents of the program 220. Thus, the description for the hardware configuration will be omitted.

In the above-described Example 6, the description has been made for the case where the input shaft of the reduction gear 2 can be regarded as kept at a constant angle. That is, the method described in Example 6 is limited to the case where the joint of the articulated robot 100 is hardly moved. Examples of such a case include a case where the load applied to the joint in the start of an assembly operation is reset as a zero point of load in the force control for the articulated robot 100, which is performed for the assembly operation, and a case where an object on which the force control is performed for assembling is a rigid body, such as a metal body.

In Example 7, the torque value is determined regardless of whether the angle of the input shaft of the reduction gear 2 is constant or not. Example 7 differs from the other examples in the correction process of Step S5 of the flowchart of FIG. 11, which has been described in Example 1.

In Example 7, the encoder 70 of FIG. 8, which is disposed with the motor 13, is preferably an absolute-type rotary encoder. The encoder 70 measures the rotation angle of the input shaft of the reduction gear 2, that is, the rotation angle of the rotary shaft of the motor 13.

When the output shaft of the reduction gear 2 is applied with a torque load, the reduction gear 2 deforms. The amount of deformation can be measured by the encoder 70 disposed at the input shaft of the reduction gear 2 and the rotation angle measurement sensor 7 disposed at the output shaft of the reduction gear 2.

Specifically, the angle-signal processing unit 251c of FIG. 8 acquires a signal outputted from the encoder 70, and determines a rotation angle value of the rotary shaft of the motor 13. The angle-signal processing unit 251a determines a relative angle value, as in Example 1. The torque-signal processing unit 251b acquires the rotation angle value and the relative angle value, and determines the amount of deformation of the reduction gear 2.

Specifically, if the reduction ratio of the reduction gear 2 is denoted by N, the amount of deformation can be determined by using a value from the angle-signal processing unit 251c, a value from the angle-signal processing unit 251a, and the reduction ratio N. For example, when the reduction ratio N is 50, the amount of deformation can be determined by dividing the difference between the value from the angle-signal processing unit 251a and the value from the angle-signal processing unit 251c, by the reduction ratio of 50.

The data on the reduction ratio N is stored in advance in the ROM 252. The torque-signal processing unit 251b converts the amount of deformation to a torque value by using the rigidity coefficient of the reduction gear 2, and sets the torque value as a torque correction value. The rigidity coefficient of the reduction gear 2 is a constant value, and is stored in advance in the ROM 252. The torque-signal processing unit 251b then adds the correction value to a torque value, and thereby determines a corrected torque value.

In this manner, the torque-signal processing unit 251b corrects the torque value by using the rotation angle of the input shaft of the reduction gear 2, the rotation angle of the output shaft of the reduction gear 2, the rigidity coefficient of the reduction gear 2, and the reduction ratio. Since the rigidity is small if the reduction gear 2 is a strain-wave-gearing reduction gear, the torque value T can be measured with the sensitivity enough to correct the torque.

Thus, in Example 7, even in a case where a joint of an articulated robot has a relatively large amount of motion when a product is assembled by performing the force control on the articulated robot, such as case where a target workpiece is a soft object such as a sponge, the torque value can be determined with high accuracy. As a result, the force control on the articulated robot becomes stable, and products can be stably manufactured.

Here, although Example 7 has been described for the configuration in which the sensors are arranged as in Example 5, the sensors of Example 7 may be arranged as in Example 1.

Other Embodiments

The embodiments of the present invention are not limited to the above-described embodiment and examples, and may be variously combined and modified within the technical concept of the present invention.

For example, although the rotation angle measurement sensors, the torque measurement sensors, and the electrical circuit for the sensors are collectively disposed on the supporting member in the above-described embodiment and examples, the rotation angle measurement scales and the torque measurement scales may be disposed on the supporting member. In other words, one of the rotation angle measurement scale and the rotation angle measurement sensor for the reduction gear may be fixed to the fixed member, and the other of the rotation angle measurement scale and the rotation angle measurement sensor may be fixed to the supporting member. In addition, one of the torque measurement scale and the torque measurement sensor used for measuring torque applied to the output member may be fixed to the supporting member, and the other of the torque measurement scale and the torque measurement sensor may be fixed to the output member.

In addition, although the sensors are based on an optical encoder in the embodiment and the examples, other encoders that can magnetically read the rotation angle may be used.

Even in such a case, the drag of the wires and the pipes can be prevented from affecting the elastic member.

Since the driving device to which the present invention is applied can detect torque with high accuracy, the driving device has excellent control accuracy for the rotation angle. Thus, if the driving device of the present embodiment is mounted on a robot as a detecting device, the operation accuracy of the robot can be increased. That is, if the driving device of the present invention is mounted on each joint of an articulated robot, such as the articulated robot of FIG. 2, and the robot is disposed in a production line, in which products are assembled or processed, to perform a manufacturing process, the products can be manufactured with high accuracy. In addition to the manufacturing of products, the driving device of the present disclosure can be applied to various robots intended to perform various operations with high accuracy.

In addition, although the description has been made, in the above-described examples, for the articulated robot 100 having a plurality of joints, the number of joints is not limited to the number of joints described in the above-described examples.

In addition, although the vertically articulated robot has been described in the above-described examples, the same configuration as that described above can be applied to the other robots, such as parallel-link robots having different types of joints. In addition, although the configuration of the articulated robot 100 has been described with reference to the example drawings of the examples, the configuration of robot is not limited to this, and may be appropriately modified in design by a person skilled in the art. In addition, the configuration of the motors used in the articulated robot 100 is not limited to the above-described configuration. For example, the driving source to drive each joint may be a device such as an artificial muscle.

In addition, the above-described embodiment can be applied to any machine that can automatically perform expansion and contraction motion, bending and stretching motion, up-and-down motion, right-and-left motion, pivot motion, or combination motion thereof, depending on information data stored in the storage device of the control device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-207591, filed Nov. 2, 2018, and Japanese Patent Application No. 2018-234944, filed Dec. 14, 2018, which are hereby incorporated by reference herein in their entirety.

What is claimed is:

1. A driving device comprising:
a driving unit disposed on a fixed member;
a supporting member;
an output member;
an elastic member configured to connect the supporting member and the output member;
a first scale;
a first sensor configured to detect a rotation angle of an output shaft of the driving unit with the first scale;
a second scale; and
a second sensor configured to detect a relative displacement between the supporting member and the output member with the second scale,
wherein one of the first scale and the first sensor is disposed on the fixed member,
wherein an other of the first scale and the first sensor and one of the second scale and the second sensor are disposed on the supporting member, and
wherein an other of the second scale and the second sensor is disposed on the output member.

2. The driving device according to claim 1, wherein the supporting member comprises a substrate,
wherein the first sensor and the second sensor are disposed on the supporting member, and
wherein the first sensor and the second sensor are mounted on the substrate.

3. The driving device according to claim 2, wherein the first sensor is mounted on a first surface of the substrate, and
wherein the second sensor is mounted on a second surface of the substrate.

4. The driving device according to claim 1, further comprising a control unit configured to correct a detection result from the second sensor in accordance with a detection result from the first sensor.

5. The driving device according to claim 4, wherein the driving unit comprises a reduction gear, and
wherein the control unit is configured to correct a detection result from the second sensor in accordance with a detection result from the first sensor and a rigidity coefficient of the reduction gear.

6. The driving device according to claim 5, further comprising a third sensor configured to output a signal corresponding to a rotation of an input shaft of the reduction gear,
wherein the control unit is configured to correct a detection result from the second sensor in accordance with a detection result from the third sensor, a detection result from the first sensor, the rigidity coefficient of the reduction gear, and a reduction ratio of the reduction gear.

7. The driving device according to claim 1, wherein, when viewed in a direction of a rotation axis of the supporting member, the first sensor and the second sensor are shifted from each other by about 90 degrees in a rotational direction of the supporting member.

8. The driving device according to claim 1, wherein a wire and/or a pipe are/is supported by the fixed member and the supporting member.

9. The driving device according to claim 8, wherein one portion of the wire and/or the pipe are/is housed in a space formed between the fixed member and the supporting member and filled with grease.

10. The driving device according to claim 2, wherein a sensor-signal processing circuit is mounted on the substrate, and
wherein the sensor-signal processing circuit is configured to process a signal from the first sensor and a signal from the second sensor.

11. The driving device according to claim 4, wherein the control unit is configured to calculate a rotation angle of the output member with respect to the fixed member in accordance with a detection result from the first sensor and a detection result from the second sensor, and control the driving unit.

12. The driving device according to claim 1, wherein the elastic member comprises plate-like elastic members disposed radially around a rotation axis of the output member and coupled to the supporting member and the output member such that a main surface of each of the plate-like elastic members is orthogonal to a circle around the rotation axis of the output member.

13. The driving device according to claim 1, wherein a joining portion between the elastic member and the supporting member has a portion in which a material of the elastic member and a material of the supporting member are melted and joined with each other, and
wherein a joining portion between the elastic member and the output member has a portion in which the material of the elastic member and a material of the output member are melted and joined with each other.

14. The driving device according to claim 1, further comprising a flow channel configured to flow fluid to a space in which the first scale and the first sensor face each other.

15. A robot comprising:
a joint comprising the driving device according to claim 1; and
a link coupled with the joint.

16. A method of controlling a driving device, the driving device comprising a driving unit disposed on a fixed member, a supporting member, an output member, an elastic member, and a control unit configured to control the driving unit, the method comprising:
inputting a first signal outputted from a first sensor to the control unit, the first sensor being used to detect a rotation angle of an output shaft of the driving unit;

inputting a second signal outputted from a second sensor to the control unit, the second sensor being used to detect a relative displacement between the supporting member and the output member; and calculating, by the control unit, a rotation angle of the output member with respect to the fixed member in accordance with the first signal and the second signal, wherein the elastic member connects the output member and the supporting member, wherein one of a first scale and the first sensor used to detect a rotation angle of the output shaft of the driving unit is disposed on the fixed member, wherein an other of the first scale and the first sensor and one of a second scale and the second sensor used to detect a relative displacement between the supporting member and the output member are disposed on the supporting member, and wherein an other of the second scale and the second sensor is disposed on the output member.

17. A detecting device comprising:
a fixed member;
a supporting member;
an output member;
an elastic member configured to connect the supporting member and the output member;
a first scale;
a first sensor configured to detect a rotation angle of an output shaft of a driving unit with the first scale;
a second scale; and
a second sensor configured to detect a relative displacement between the supporting member and the output member with the second scale,
wherein one of the first scale and the first sensor is disposed on the fixed member,
wherein an other of the first scale and the first sensor and one of the second scale and the second sensor are disposed on the supporting member, and
wherein an other of the second scale and the second sensor is disposed on the output member.

18. The detecting device according to claim 17, further comprising a control unit,
wherein the control unit is configured to correct a detection result from the second sensor in accordance with a detection result from the first sensor.

19. A method of manufacturing a product, the method comprising:
causing the robot according to claim 15 to handle a workpiece and manufacture the product.

20. A computer-readable non-transitory recording medium storing a control program that causes a computer to perform the method according to claim 16.

21. A driving device comprising:
a driving unit;
a supporting member;
an output member;
an elastic member configured to connect the supporting member and the output member;
a first sensor configured to detect a rotation angle of an output shaft of the driving unit; and
a second sensor configured to detect a relative displacement between the supporting member and the output member,
wherein the first sensor and the second sensor are disposed on the supporting member.

22. A detecting device comprising:
a supporting member;
an output member;
an elastic member configured to connect the supporting member and the output member;
a first sensor configured to detect a rotation angle of an output shaft of a driving unit, and
a second sensor configured to detect a relative displacement between the supporting member and the output member,
wherein the first sensor and the second sensor are disposed on the supporting member.

* * * * *